United States Patent
Canfield

(10) Patent No.: US 12,289,584 B2
(45) Date of Patent: Apr. 29, 2025

(54) NETWORKED AUTOMIXER SYSTEMS AND METHODS

(71) Applicant: Shure Acquisition Holdings, Inc., Niles, IL (US)

(72) Inventor: Gregory H. Canfield, Niles, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 142 days.

(21) Appl. No.: 17/960,009

(22) Filed: Oct. 4, 2022

(65) Prior Publication Data

US 2023/0104602 A1  Apr. 6, 2023

Related U.S. Application Data

(60) Provisional application No. 63/262,074, filed on Oct. 4, 2021.

(51) Int. Cl.
| | |
|---|---|
| *H04R 3/00* | (2006.01) |
| *H04R 3/04* | (2006.01) |
| *H04R 5/04* | (2006.01) |

(52) U.S. Cl.
CPC ............... *H04R 3/005* (2013.01); *H04R 3/04* (2013.01); *H04R 5/04* (2013.01); *H04R 2420/01* (2013.01)

(58) Field of Classification Search
None
See application file for complete search history.

(56) References Cited

U.S. PATENT DOCUMENTS

| | | | |
|---|---|---|---|
| 1,535,408 A | 4/1925 | Fricke | |
| 1,540,788 A | 6/1925 | McClure | |
| 1,965,830 A | 7/1934 | Hammer | |
| 2,075,588 A | 3/1937 | Meyers | |
| 2,113,219 A | 4/1938 | Olson | |
| 2,164,655 A | 7/1939 | Kleerup | |
| D122,771 S | 10/1940 | Doner | |

(Continued)

FOREIGN PATENT DOCUMENTS

| | | |
|---|---|---|
| CA | 2359771 | 4/2003 |
| CA | 2475283 | 1/2005 |

(Continued)

OTHER PUBLICATIONS

"Philips Hue Bulbs and Wireless Connected Lighting System," Web page https://www.philips-hue.com/en-in, 8 pp, Sep. 23, 2020, retrieved from Internet Archive Wayback Machine, <https://web.archive.org/web/20200923171037/https://www.philips-hue.com/en-in> on Sep. 27, 2021. 8 pages.

(Continued)

*Primary Examiner* — James K Mooney
(74) *Attorney, Agent, or Firm* — Neal, Gerber & Eisenberg LLP

(57) ABSTRACT

Systems and methods are disclosed for networked audio automixing using array microphones and an aggregator unit that participate in making a common gating decision to determine which channels to gate on and off. Through the use of such a network of array microphones having the capability to generate submix audio signals and reduced bandwidth metrics, as well as AEC processing capability, array microphone lobe selection can be enhanced while maximizing signal-to-noise ratio, increasing intelligibility, and increasing user satisfaction.

23 Claims, 9 Drawing Sheets

(56) References Cited

U.S. PATENT DOCUMENTS

| | | |
|---|---|---|
| 2,233,412 A | 3/1941 | Hill |
| 2,268,529 A | 12/1941 | Stiles |
| 2,343,037 A | 2/1944 | Adelman |
| 2,377,449 A | 6/1945 | Prevette |
| 2,481,250 A | 9/1949 | Schneider |
| 2,521,603 A | 9/1950 | Prew |
| 2,533,565 A | 12/1950 | Eichelman |
| 2,539,671 A | 1/1951 | Olson |
| 2,777,232 A | 1/1957 | Kulicke |
| 2,828,508 A | 4/1958 | Labarre |
| 2,840,181 A | 6/1958 | Wildman |
| 2,882,633 A | 4/1959 | Howell |
| 2,912,605 A | 11/1959 | Tibbetts |
| 2,938,113 A | 5/1960 | Schnell |
| 2,950,556 A | 8/1960 | Larios |
| 3,019,854 A | 2/1962 | Obryant |
| 3,132,713 A | 5/1964 | Seeler |
| 3,143,182 A | 8/1964 | Sears |
| 3,160,225 A | 12/1964 | Sechrist |
| 3,161,975 A | 12/1964 | McMillan |
| 3,205,601 A | 9/1965 | Gawne |
| 3,239,973 A | 3/1966 | Hannes |
| 3,240,883 A | 3/1966 | Seeler |
| 3,310,901 A | 3/1967 | Sarkisian |
| 3,321,170 A | 5/1967 | Vye |
| 3,509,290 A | 4/1970 | Mochida |
| 3,573,399 A | 4/1971 | Schroeder |
| 3,657,490 A | 4/1972 | Scheiber |
| 3,696,885 A | 10/1972 | Grieg |
| 3,755,625 A | 8/1973 | Maston |
| 3,828,508 A | 8/1974 | Moeller |
| 3,857,191 A | 12/1974 | Sadorus |
| 3,895,194 A | 7/1975 | Fraim |
| 3,906,431 A | 9/1975 | Clearwaters |
| D237,103 S | 10/1975 | Fisher |
| 3,936,606 A | 2/1976 | Wanke |
| 3,938,617 A | 2/1976 | Forbes |
| 3,941,638 A | 3/1976 | Horky |
| 3,992,584 A | 11/1976 | Dugan |
| 4,007,461 A | 2/1977 | Luedtke |
| 4,008,408 A | 2/1977 | Kodama |
| 4,029,170 A | 6/1977 | Phillips |
| 4,032,725 A | 6/1977 | McGee |
| 4,070,547 A | 1/1978 | Dellar |
| 4,072,821 A | 2/1978 | Bauer |
| 4,096,353 A | 6/1978 | Bauer |
| 4,127,156 A | 11/1978 | Brandt |
| 4,131,760 A | 12/1978 | Christensen |
| 4,169,219 A | 9/1979 | Beard |
| 4,184,048 A | 1/1980 | Alcaide |
| 4,198,705 A | 4/1980 | Massa |
| D255,234 S | 6/1980 | Wellward |
| D256,015 S | 7/1980 | Doherty |
| 4,212,133 A | 7/1980 | Lufkin |
| 4,237,339 A | 12/1980 | Bunting |
| 4,244,096 A | 1/1981 | Kashichi |
| 4,244,906 A | 1/1981 | Heinemann |
| 4,254,417 A | 3/1981 | Speiser |
| 4,275,694 A | 6/1981 | Nagaishi |
| 4,296,280 A | 10/1981 | Richie |
| 4,305,141 A | 12/1981 | Massa |
| 4,308,425 A | 12/1981 | Momose |
| 4,311,874 A | 1/1982 | Wallace, Jr. |
| 4,330,691 A | 5/1982 | Gordon |
| 4,334,740 A | 6/1982 | Wray |
| 4,365,449 A | 12/1982 | Liautaud |
| 4,373,191 A | 2/1983 | Fette |
| 4,393,631 A | 7/1983 | Krent |
| 4,414,433 A | 11/1983 | Horie |
| 4,429,850 A | 2/1984 | Weber |
| 4,436,966 A | 3/1984 | Botros |
| 4,449,238 A | 5/1984 | Lee |
| 4,466,117 A | 8/1984 | Rudolf |
| 4,485,484 A | 11/1984 | Flanagan |
| 4,489,442 A | 12/1984 | Anderson |
| 4,518,826 A | 5/1985 | Caudill |
| 4,521,908 A | 6/1985 | Miyaji |
| 4,566,557 A | 1/1986 | Lemaitre |
| 4,593,404 A | 6/1986 | Bolin |
| 4,594,478 A | 6/1986 | Gumb |
| D285,067 S | 8/1986 | Delbuck |
| 4,625,827 A | 12/1986 | Bartlett |
| 4,653,102 A | 3/1987 | Hansen |
| 4,658,425 A | 4/1987 | Julstrom |
| 4,669,108 A | 5/1987 | Deinzer |
| 4,675,906 A | 6/1987 | Sessler |
| 4,693,174 A | 9/1987 | Anderson |
| 4,696,043 A | 9/1987 | Iwahara |
| 4,712,231 A | 12/1987 | Julstrom |
| 4,741,038 A | 4/1988 | Elko |
| 4,752,961 A | 6/1988 | Kahn |
| 4,805,730 A | 2/1989 | O'Neill |
| 4,815,132 A | 3/1989 | Minami |
| 4,860,366 A | 8/1989 | Fukushi |
| 4,862,507 A | 8/1989 | Woodard |
| 4,866,868 A | 9/1989 | Kass |
| 4,881,135 A | 11/1989 | Heilweil |
| 4,888,807 A | 12/1989 | Reichel |
| 4,903,247 A | 2/1990 | Van Gerwen |
| 4,923,032 A | 5/1990 | Nuernberger |
| 4,928,312 A | 5/1990 | Hill |
| 4,969,197 A | 11/1990 | Takaya |
| 5,000,286 A | 3/1991 | Crawford |
| 5,038,935 A | 8/1991 | Wenkman |
| 5,058,170 A | 10/1991 | Kanamori |
| 5,088,574 A | 2/1992 | Kertesz, III |
| D324,780 S | 3/1992 | Sebesta |
| 5,121,426 A | 6/1992 | Baumhauer |
| D329,239 S | 9/1992 | Hahn |
| 5,189,701 A | 2/1993 | Jain |
| 5,204,907 A | 4/1993 | Staple |
| 5,214,709 A | 5/1993 | Ribic |
| D340,718 S | 10/1993 | Leger |
| 5,289,544 A | 2/1994 | Franklin |
| D345,346 S | 3/1994 | Alfonso |
| D345,379 S | 3/1994 | Chan |
| 5,297,210 A | 3/1994 | Julstrom |
| 5,322,979 A | 6/1994 | Cassity |
| 5,323,459 A | 6/1994 | Hirano |
| 5,329,593 A | 7/1994 | Lazzeroni |
| 5,335,011 A | 8/1994 | Addeo |
| 5,353,279 A | 10/1994 | Koyama |
| 5,359,374 A | 10/1994 | Schwartz |
| 5,371,789 A | 12/1994 | Hirano |
| 5,383,293 A | 1/1995 | Royal |
| 5,384,843 A | 1/1995 | Masuda |
| 5,396,554 A | 3/1995 | Hirano |
| 5,400,413 A | 3/1995 | Kindel |
| D363,045 S | 10/1995 | Phillips |
| 5,473,701 A | 12/1995 | Cezanne |
| 5,509,634 A | 4/1996 | Gebka |
| 5,513,265 A | 4/1996 | Hirano |
| 5,525,765 A | 6/1996 | Freiheit |
| 5,550,924 A | 8/1996 | Helf |
| 5,550,925 A | 8/1996 | Hori |
| 5,555,447 A | 9/1996 | Kotzin |
| 5,574,793 A | 11/1996 | Hirschhorn |
| 5,602,962 A | 2/1997 | Kellermann |
| 5,633,936 A | 5/1997 | Oh |
| 5,645,257 A | 7/1997 | Ward |
| D382,118 S | 8/1997 | Ferrero |
| 5,657,393 A | 8/1997 | Crow |
| 5,661,813 A | 8/1997 | Shimauchi |
| 5,673,327 A | 9/1997 | Julstrom |
| 5,687,229 A | 11/1997 | Sih |
| 5,706,344 A | 1/1998 | Finn |
| 5,715,319 A | 2/1998 | Chu |
| 5,717,171 A | 2/1998 | Miller |
| D392,977 S | 3/1998 | Kim |
| D394,061 S | 5/1998 | Fink |
| 5,761,318 A | 6/1998 | Shimauchi |
| 5,766,702 A | 6/1998 | Lin |
| 5,787,183 A | 7/1998 | Chu |
| 5,796,819 A | 8/1998 | Romesburg |

(56) References Cited

U.S. PATENT DOCUMENTS

| | | |
|---|---|---|
| 5,848,146 A | 12/1998 | Slattery |
| 5,870,482 A | 2/1999 | Loeppert |
| 5,878,147 A | 3/1999 | Killion |
| 5,888,412 A | 3/1999 | Sooriakumar |
| 5,888,439 A | 3/1999 | Miller |
| D416,315 S | 11/1999 | Nanjo |
| 5,978,211 A | 11/1999 | Hong |
| 5,991,277 A | 11/1999 | Maeng |
| 6,035,962 A | 3/2000 | Lin |
| 6,039,457 A | 3/2000 | O'Neal |
| 6,041,127 A | 3/2000 | Elko |
| 6,049,607 A | 4/2000 | Marash |
| D424,538 S | 5/2000 | Hayashi |
| 6,069,961 A | 5/2000 | Nakazawa |
| 6,125,179 A | 9/2000 | Wu |
| D432,518 S | 10/2000 | Muto |
| 6,128,395 A | 10/2000 | De Vries |
| 6,137,887 A | 10/2000 | Anderson |
| 6,144,746 A | 11/2000 | Azima |
| 6,151,399 A | 11/2000 | Killion |
| 6,173,059 B1 | 1/2001 | Huang |
| 6,198,831 B1 | 3/2001 | Azima |
| 6,205,224 B1 | 3/2001 | Underbrink |
| 6,215,881 B1 | 4/2001 | Azima |
| 6,266,427 B1 | 7/2001 | Mathur |
| 6,285,770 B1 | 9/2001 | Azima |
| 6,301,357 B1 | 10/2001 | Romesburg |
| 6,329,908 B1 | 12/2001 | Frecska |
| 6,332,029 B1 | 12/2001 | Azima |
| D453,016 S | 1/2002 | Nevill |
| 6,386,315 B1 | 5/2002 | Roy |
| 6,393,129 B1 | 5/2002 | Conrad |
| 6,424,635 B1 | 7/2002 | Song |
| 6,442,272 B1 | 8/2002 | Osovets |
| 6,449,593 B1 | 9/2002 | Valve |
| 6,481,173 B1 | 11/2002 | Roy |
| 6,488,367 B1 | 12/2002 | Debesis |
| D469,090 S | 1/2003 | Tsuji |
| 6,505,057 B1 | 1/2003 | Finn |
| 6,507,659 B1 | 1/2003 | Iredale |
| 6,510,919 B1 | 1/2003 | Roy |
| 6,526,147 B1 | 2/2003 | Rung |
| 6,556,682 B1 | 4/2003 | Gilloire |
| 6,592,237 B1 | 7/2003 | Pledger |
| 6,622,030 B1 | 9/2003 | Romesburg |
| D480,923 S | 10/2003 | Neubourg |
| 6,633,647 B1 | 10/2003 | Markow |
| 6,665,971 B2 | 12/2003 | Lowry |
| 6,694,028 B1 | 2/2004 | Matsuo |
| 6,704,422 B1 | 3/2004 | Jensen |
| D489,707 S | 5/2004 | Kobayashi |
| 6,731,334 B1 | 5/2004 | Maeng |
| 6,741,720 B1 | 5/2004 | Myatt |
| 6,757,393 B1 | 6/2004 | Spitzer |
| 6,768,795 B2 | 7/2004 | Feltstroem |
| 6,868,377 B1 | 3/2005 | Laroche |
| 6,885,750 B2 | 4/2005 | Egelmeers |
| 6,885,986 B1 | 4/2005 | Gigi |
| D504,889 S | 5/2005 | Andre |
| 6,889,183 B1 | 5/2005 | Gunduzhan |
| 6,895,093 B1 | 5/2005 | Ali |
| 6,931,123 B1 | 8/2005 | Hughes |
| 6,944,312 B2 | 9/2005 | Mason |
| D510,729 S | 10/2005 | Chen |
| 6,968,064 B1 | 11/2005 | Ning |
| 6,990,193 B2 | 1/2006 | Beaucoup |
| 6,993,126 B1 | 1/2006 | Kyrylenko |
| 6,993,145 B2 | 1/2006 | Combest |
| 7,003,099 B1 | 2/2006 | Zhang |
| 7,013,267 B1 | 3/2006 | Huart |
| 7,031,269 B2 | 4/2006 | Lee |
| 7,035,398 B2 | 4/2006 | Matsuo |
| 7,035,415 B2 | 4/2006 | Belt |
| 7,050,576 B2 | 5/2006 | Zhang |
| 7,054,451 B2 | 5/2006 | Janse |
| D526,643 S | 8/2006 | Ishizaki |
| D527,372 S | 8/2006 | Allen |
| 7,092,516 B2 | 8/2006 | Furuta |
| 7,092,882 B2 | 8/2006 | Arrowood |
| 7,098,865 B2 | 8/2006 | Christensen |
| 7,106,876 B2 | 9/2006 | Santiago |
| 7,120,269 B2 | 10/2006 | Lowell |
| 7,130,309 B2 | 10/2006 | Boaz |
| D533,177 S | 12/2006 | Andre |
| 7,149,320 B2 | 12/2006 | Haykin |
| 7,161,534 B2 | 1/2007 | Tsai |
| 7,187,765 B2 | 3/2007 | Popovic |
| 7,203,308 B2 | 4/2007 | Kubota |
| D542,543 S | 5/2007 | Bruce |
| 7,212,628 B2 | 5/2007 | Mirjana |
| D546,318 S | 7/2007 | Yoon |
| D546,814 S | 7/2007 | Takita |
| D547,748 S | 7/2007 | Tsuge |
| 7,239,714 B2 | 7/2007 | De Blok |
| D549,673 S | 8/2007 | Niitsu |
| 7,269,263 B2 | 9/2007 | Dedieu |
| D552,570 S | 10/2007 | Niitsu |
| D559,553 S | 1/2008 | James |
| 7,333,476 B2 | 2/2008 | LeBlanc |
| D566,685 S | 4/2008 | Koller |
| 7,359,504 B1 | 4/2008 | Reuss |
| 7,366,310 B2 | 4/2008 | Stinson |
| 7,387,151 B1 | 6/2008 | Payne |
| 7,412,376 B2 | 8/2008 | Florencio |
| 7,415,117 B2 | 8/2008 | Tashev |
| D578,509 S | 10/2008 | Thomas |
| D581,510 S | 11/2008 | Albano |
| D582,391 S | 12/2008 | Morimoto |
| D587,709 S | 3/2009 | Niitsu |
| D589,605 S | 3/2009 | Reedy |
| 7,503,616 B2 | 3/2009 | Linhard |
| 7,515,719 B2 | 4/2009 | Hooley |
| 7,536,769 B2 | 5/2009 | Pedersen |
| D595,402 S | 6/2009 | Miyake |
| D595,736 S | 7/2009 | Son |
| 7,558,381 B1 | 7/2009 | Ali |
| 7,565,949 B2 | 7/2009 | Tojo |
| D601,585 S | 10/2009 | Andre |
| 7,651,390 B1 | 1/2010 | Profeta |
| 7,660,428 B2 | 2/2010 | Rodman |
| 7,667,728 B2 | 2/2010 | Kenoyer |
| 7,672,445 B1 | 3/2010 | Zhang |
| D613,338 S | 4/2010 | Marukos |
| 7,701,110 B2 | 4/2010 | Fukuda |
| 7,702,116 B2 | 4/2010 | Stone |
| D614,871 S | 5/2010 | Tang |
| 7,724,891 B2 | 5/2010 | Beaucoup |
| D617,441 S | 6/2010 | Koury |
| 7,747,001 B2 | 6/2010 | Kellermann |
| 7,756,278 B2 | 7/2010 | Moorer |
| 7,783,063 B2 | 8/2010 | Pocino |
| 7,787,328 B2 | 8/2010 | Chu |
| 7,830,862 B2 | 11/2010 | James |
| 7,831,035 B2 | 11/2010 | Stokes |
| 7,831,036 B2 | 11/2010 | Beaucoup |
| 7,856,097 B2 | 12/2010 | Tokuda |
| 7,881,486 B1 | 2/2011 | Killion |
| 7,894,421 B2 | 2/2011 | Kwan |
| D636,188 S | 4/2011 | Kim |
| 7,925,006 B2 | 4/2011 | Hirai |
| 7,925,007 B2 | 4/2011 | Stokes |
| 7,936,886 B2 | 5/2011 | Kim |
| 7,970,123 B2 | 6/2011 | Beaucoup |
| 7,970,151 B2 | 6/2011 | Oxford |
| D642,385 S | 8/2011 | Lee |
| D643,015 S | 8/2011 | Kim |
| 7,991,167 B2 | 8/2011 | Oxford |
| 7,995,768 B2 | 8/2011 | Miki |
| 8,000,481 B2 | 8/2011 | Nishikawa |
| 8,005,238 B2 | 8/2011 | Tashev |
| 8,019,091 B2 | 9/2011 | Burnett |
| 8,041,054 B2 | 10/2011 | Yeldener |
| 8,059,843 B2 | 11/2011 | Hung |
| 8,064,629 B2 | 11/2011 | Jiang |

(56) References Cited

U.S. PATENT DOCUMENTS

| | | |
|---|---|---|
| 8,085,947 B2 | 12/2011 | Haulick |
| 8,085,949 B2 | 12/2011 | Kim |
| 8,095,120 B1 | 1/2012 | Blair |
| 8,098,842 B2 | 1/2012 | Florencio |
| 8,098,844 B2 | 1/2012 | Elko |
| 8,103,030 B2 | 1/2012 | Barthel |
| 8,109,360 B2 | 2/2012 | Stewart, Jr. |
| 8,112,272 B2 | 2/2012 | Nagahama |
| 8,116,500 B2 | 2/2012 | Oxford |
| 8,121,834 B2 | 2/2012 | Rosec |
| D655,271 S | 3/2012 | Park |
| D656,473 S | 3/2012 | Laube |
| 8,130,969 B2 | 3/2012 | Buck |
| 8,130,977 B2 | 3/2012 | Chu |
| 8,135,143 B2 | 3/2012 | Ishibashi |
| 8,144,886 B2 | 3/2012 | Ishibashi |
| D658,153 S | 4/2012 | Woo |
| 8,155,331 B2 | 4/2012 | Nakadai |
| 8,170,882 B2 | 5/2012 | Davis |
| 8,175,291 B2 | 5/2012 | Chan |
| 8,175,871 B2 | 5/2012 | Wang |
| 8,184,801 B1 | 5/2012 | Hamalainen |
| 8,189,765 B2 | 5/2012 | Nishikawa |
| 8,189,810 B2 | 5/2012 | Wolff |
| 8,194,863 B2 | 6/2012 | Takumai |
| 8,199,927 B1 | 6/2012 | Raftery |
| 8,204,198 B2 | 6/2012 | Adeney |
| 8,204,248 B2 | 6/2012 | Haulick |
| 8,208,664 B2 | 6/2012 | Iwasaki |
| 8,213,596 B2 | 7/2012 | Beaucoup |
| 8,213,634 B1 | 7/2012 | Daniel |
| 8,219,387 B2 | 7/2012 | Cutler |
| 8,229,134 B2 | 7/2012 | Duraiswami |
| 8,233,352 B2 | 7/2012 | Beaucoup |
| 8,243,951 B2 | 8/2012 | Ishibashi |
| 8,244,536 B2 | 8/2012 | Arun |
| 8,249,273 B2 | 8/2012 | Inoda |
| 8,259,959 B2 | 9/2012 | Marton |
| 8,275,120 B2 | 9/2012 | Stokes, III |
| 8,280,728 B2 | 10/2012 | Chen |
| 8,284,949 B2 | 10/2012 | Farhang |
| 8,284,952 B2 | 10/2012 | Reining |
| 8,286,749 B2 | 10/2012 | Stewart |
| 8,290,142 B1 | 10/2012 | Lambert |
| 8,291,670 B2 | 10/2012 | Gard |
| 8,297,402 B2 | 10/2012 | Stewart |
| 8,315,380 B2 | 11/2012 | Liu |
| 8,331,582 B2 | 12/2012 | Steele |
| 8,345,898 B2 | 1/2013 | Reining |
| 8,355,521 B2 | 1/2013 | Larson |
| 8,370,140 B2 | 2/2013 | Vitte |
| 8,379,823 B2 | 2/2013 | Ratmanski |
| 8,385,557 B2 | 2/2013 | Tashev |
| D678,329 S | 3/2013 | Lee |
| 8,395,653 B2 | 3/2013 | Feng |
| 8,403,107 B2 | 3/2013 | Stewart |
| 8,406,436 B2 | 3/2013 | Craven |
| 8,428,661 B2 | 4/2013 | Chen |
| 8,433,061 B2 | 4/2013 | Cutler |
| D682,266 S | 5/2013 | Wu |
| 8,437,490 B2 | 5/2013 | Marton |
| 8,443,930 B2 | 5/2013 | Stewart, Jr. |
| 8,447,590 B2 | 5/2013 | Ishibashi |
| 8,472,639 B2 | 6/2013 | Reining |
| 8,472,640 B2 | 6/2013 | Marton |
| D685,346 S | 7/2013 | Szymanski |
| D686,182 S | 7/2013 | Ashiwa |
| 8,479,871 B2 | 7/2013 | Stewart |
| 8,483,398 B2 | 7/2013 | Fozunbal |
| 8,498,423 B2 | 7/2013 | Thaden |
| D687,432 S | 8/2013 | Duan |
| 8,503,653 B2 | 8/2013 | Ahuja |
| 8,515,089 B2 | 8/2013 | Nicholson |
| 8,515,109 B2 | 8/2013 | Dittberner |
| 8,526,633 B2 | 9/2013 | Ukai |
| 8,553,904 B2 | 10/2013 | Said |
| 8,559,611 B2 | 10/2013 | Ratmanski |
| D693,328 S | 11/2013 | Goetzen |
| 8,583,481 B2 | 11/2013 | Viveiros |
| 8,599,194 B2 | 12/2013 | Lewis |
| 8,600,443 B2 | 12/2013 | Kawaguchi |
| 8,605,890 B2 | 12/2013 | Zhang |
| 8,620,650 B2 | 12/2013 | Walters |
| 8,631,897 B2 | 1/2014 | Stewart |
| 8,634,569 B2 | 1/2014 | Lu |
| 8,638,951 B2 | 1/2014 | Zurek |
| D699,712 S | 2/2014 | Bourne |
| 8,644,477 B2 | 2/2014 | Gilbert |
| 8,654,955 B1 | 2/2014 | Lambert |
| 8,654,990 B2 | 2/2014 | Faller |
| 8,660,274 B2 | 2/2014 | Wolff |
| 8,660,275 B2 | 2/2014 | Buck |
| 8,670,581 B2 | 3/2014 | Harman |
| 8,672,087 B2 | 3/2014 | Stewart |
| 8,675,890 B2 | 3/2014 | Schmidt |
| 8,675,899 B2 | 3/2014 | Jung |
| 8,676,728 B1 | 3/2014 | Velusamy |
| 8,682,675 B2 | 3/2014 | Togami |
| 8,724,829 B2 | 5/2014 | Visser |
| 8,730,156 B2 | 5/2014 | Weising |
| 8,744,069 B2 | 6/2014 | Cutler |
| 8,744,101 B1 | 6/2014 | Burns |
| 8,755,536 B2 | 6/2014 | Chen |
| 8,787,560 B2 | 7/2014 | Buck |
| 8,811,601 B2 | 8/2014 | Mohammad |
| 8,818,002 B2 | 8/2014 | Tashev |
| 8,824,693 B2 | 9/2014 | Åhgren |
| 8,842,851 B2 | 9/2014 | Beaucoup |
| 8,855,326 B2 | 10/2014 | Derkx |
| 8,855,327 B2 | 10/2014 | Tanaka |
| 8,861,713 B2 | 10/2014 | Xu |
| 8,861,756 B2 | 10/2014 | Zhu |
| 8,873,789 B2 | 10/2014 | Bigeh |
| D717,272 S | 11/2014 | Kim |
| 8,886,343 B2 | 11/2014 | Ishibashi |
| 8,893,849 B2 | 11/2014 | Hudson |
| 8,898,633 B2 | 11/2014 | Bryant |
| D718,731 S | 12/2014 | Lee |
| 8,903,106 B2 | 12/2014 | Meyer |
| 8,923,529 B2 | 12/2014 | McCowan |
| 8,929,564 B2 | 1/2015 | Kikkeri |
| 8,942,382 B2 | 1/2015 | Elko |
| 8,965,546 B2 | 2/2015 | Visser |
| D725,059 S | 3/2015 | Kim |
| D725,631 S | 3/2015 | McNamara |
| 8,976,977 B2 | 3/2015 | De |
| 8,983,089 B1 | 3/2015 | Chu |
| 8,983,834 B2 | 3/2015 | Davis |
| D726,144 S | 4/2015 | Kang |
| D727,968 S | 4/2015 | Onoue |
| 9,002,028 B2 | 4/2015 | Haulick |
| D729,767 S | 5/2015 | Lee |
| 9,038,301 B2 | 5/2015 | Zelbacher |
| 9,088,336 B2 | 7/2015 | Mani |
| 9,094,496 B2 | 7/2015 | Teutsch |
| D735,717 S | 8/2015 | Lam |
| D737,245 S | 8/2015 | Fan |
| 9,099,094 B2 | 8/2015 | Burnett |
| 9,107,001 B2 | 8/2015 | Diethorn |
| 9,111,543 B2 | 8/2015 | Åhgren |
| 9,113,242 B2 | 8/2015 | Hyun |
| 9,113,247 B2 | 8/2015 | Chatlani |
| 9,126,827 B2 | 9/2015 | Hsieh |
| 9,129,223 B1 | 9/2015 | Velusamy |
| 9,140,054 B2 | 9/2015 | Oberbroeckling |
| D740,279 S | 10/2015 | Wu |
| 9,172,345 B2 | 10/2015 | Kok |
| D743,376 S | 11/2015 | Kim |
| D743,939 S | 11/2015 | Seong |
| 9,196,261 B2 | 11/2015 | Burnett |
| 9,197,974 B1 | 11/2015 | Clark |
| 9,203,494 B2 | 12/2015 | Tarighat Mehrabani |
| 9,215,327 B2 | 12/2015 | Bathurst |
| 9,215,543 B2 | 12/2015 | Sun |

(56) References Cited

U.S. PATENT DOCUMENTS

| | | |
|---|---|---|
| 9,226,062 B2 | 12/2015 | Sun |
| 9,226,070 B2 | 12/2015 | Hyun |
| 9,226,088 B2 | 12/2015 | Pandey |
| 9,232,185 B2 | 1/2016 | Graham |
| 9,237,391 B2 | 1/2016 | Benesty |
| 9,247,367 B2 | 1/2016 | Nobile |
| 9,253,567 B2 | 2/2016 | Morcelli |
| 9,257,132 B2 | 2/2016 | Gowreesunker |
| 9,264,553 B2 | 2/2016 | Pandey |
| 9,264,805 B2 | 2/2016 | Buck |
| 9,280,985 B2 | 3/2016 | Tawada |
| 9,286,908 B2 | 3/2016 | Zhang |
| 9,294,839 B2 | 3/2016 | Lambert |
| 9,301,049 B2 | 3/2016 | Elko |
| D754,103 S | 4/2016 | Fischer |
| 9,307,326 B2 | 4/2016 | Elko |
| 9,319,532 B2 | 4/2016 | Bao |
| 9,319,799 B2 | 4/2016 | Salmon |
| 9,326,060 B2 | 4/2016 | Nicholson |
| D756,502 S | 5/2016 | Lee |
| 9,330,673 B2 | 5/2016 | Cho |
| 9,338,301 B2 | 5/2016 | Pocino |
| 9,338,549 B2 | 5/2016 | Haulick |
| 9,354,310 B2 | 5/2016 | Visser |
| 9,357,080 B2 | 5/2016 | Beaucoup |
| 9,403,670 B2 | 8/2016 | Schelling |
| 9,426,598 B2 | 8/2016 | Walsh |
| D767,748 S | 9/2016 | Nakai |
| 9,451,078 B2 | 9/2016 | Yang |
| D769,239 S | 10/2016 | Li |
| 9,462,378 B2 | 10/2016 | Kuech |
| 9,473,868 B2 | 10/2016 | Huang |
| 9,479,627 B1 | 10/2016 | Rung |
| 9,479,885 B1 | 10/2016 | Ivanov |
| 9,489,948 B1 | 11/2016 | Chu |
| 9,510,090 B2 | 11/2016 | Lissek |
| 9,514,723 B2 | 12/2016 | Silfvast |
| 9,516,412 B2 | 12/2016 | Shigenaga |
| 9,521,057 B2 | 12/2016 | Klingbeil |
| 9,549,245 B2 | 1/2017 | Frater |
| 9,560,446 B1 | 1/2017 | Chang |
| 9,560,451 B2 | 1/2017 | Eichfeld |
| 9,565,493 B2 | 2/2017 | Abraham |
| 9,578,413 B2 | 2/2017 | Sawa |
| 9,578,440 B2 | 2/2017 | Otto |
| 9,589,556 B2 | 3/2017 | Gao |
| 9,591,123 B2 | 3/2017 | Sorensen |
| 9,591,404 B1 | 3/2017 | Chhetri |
| D784,299 S | 4/2017 | Cho |
| 9,615,173 B2 | 4/2017 | Sako |
| 9,628,596 B1 | 4/2017 | Bullough |
| 9,635,186 B2 | 4/2017 | Pandey |
| 9,635,474 B2 | 4/2017 | Kuster |
| D787,481 S | 5/2017 | Tyss |
| D788,073 S | 5/2017 | Silvera |
| 9,640,187 B2 | 5/2017 | Niemisto |
| 9,641,688 B2 | 5/2017 | Pandey |
| 9,641,929 B2 | 5/2017 | Li |
| 9,641,935 B1 | 5/2017 | Ivanov |
| 9,653,091 B2 | 5/2017 | Matsuo |
| 9,653,092 B2 | 5/2017 | Sun |
| 9,655,001 B2 | 5/2017 | Metzger |
| 9,659,576 B1 | 5/2017 | Kotvis |
| D789,323 S | 6/2017 | Mackiewicz |
| 9,674,604 B2 | 6/2017 | Deroo |
| 9,692,882 B2 | 6/2017 | Mani |
| 9,706,057 B2 | 7/2017 | Mani |
| 9,716,944 B2 | 7/2017 | Yliaho |
| 9,721,582 B1 | 8/2017 | Huang |
| 9,734,835 B2 | 8/2017 | Fujieda |
| 9,754,572 B2 | 9/2017 | Salazar |
| 9,761,243 B2 | 9/2017 | Taenzer |
| D801,285 S | 10/2017 | Timmins |
| 9,788,119 B2 | 10/2017 | Vilermo |
| 9,813,806 B2 | 11/2017 | Graham |
| 9,818,426 B2 | 11/2017 | Kotera |
| 9,826,211 B2 | 11/2017 | Sawa |
| 9,854,101 B2 | 12/2017 | Pandey |
| 9,854,363 B2 | 12/2017 | Sladeczek |
| 9,860,439 B2 | 1/2018 | Sawa |
| 9,866,952 B2 | 1/2018 | Pandey |
| D811,393 S | 2/2018 | Ahn |
| 9,894,434 B2 | 2/2018 | Rollow, IV |
| 9,930,448 B1 | 3/2018 | Chen |
| 9,936,290 B2 | 4/2018 | Mohammad |
| 9,966,059 B1 | 5/2018 | Ayrapetian |
| 9,973,848 B2 | 5/2018 | Chhetri |
| 9,980,042 B1 | 5/2018 | Benattar |
| D819,607 S | 6/2018 | Chui |
| D819,631 S | 6/2018 | Matsumiya |
| 10,015,589 B1 | 7/2018 | Ebenezer |
| 10,021,506 B2 | 7/2018 | Johnson |
| 10,021,515 B1 | 7/2018 | Mallya |
| 10,034,116 B2 | 7/2018 | Kadri |
| 10,054,320 B2 | 8/2018 | Choi |
| 10,061,009 B1 | 8/2018 | Family |
| 10,062,379 B2 | 8/2018 | Katuri |
| 10,153,744 B1 | 12/2018 | Every |
| 10,165,386 B2 | 12/2018 | Lehtiniemi |
| D841,589 S | 2/2019 | Böhmer |
| 10,206,030 B2 | 2/2019 | Matsumoto |
| 10,210,882 B1 | 2/2019 | McCowan |
| 10,231,062 B2 | 3/2019 | Pedersen |
| 10,244,121 B2 | 3/2019 | Mani |
| 10,244,219 B2 | 3/2019 | Sawa |
| 10,269,343 B2 | 4/2019 | Wingate |
| 10,366,702 B2 | 7/2019 | Morton |
| 10,367,948 B2 | 7/2019 | Wells-Rutherford |
| D857,873 S | 8/2019 | Shimada |
| 10,389,861 B2 | 8/2019 | Mani |
| 10,389,885 B2 | 8/2019 | Sun |
| D860,319 S | 9/2019 | Beruto |
| D860,997 S | 9/2019 | Jhun |
| D864,136 S | 10/2019 | Kim |
| 10,440,469 B2 | 10/2019 | Barnett |
| D865,723 S | 11/2019 | Cho |
| 10,566,008 B2 | 2/2020 | Thorpe |
| 10,602,267 B2 | 3/2020 | Grosche |
| D883,952 S | 5/2020 | Lucas |
| 10,650,797 B2 | 5/2020 | Kumar |
| D888,020 S | 6/2020 | Lyu |
| 10,728,653 B2 | 7/2020 | Graham |
| D900,070 S | 10/2020 | Lantz |
| D900,071 S | 10/2020 | Lantz |
| D900,072 S | 10/2020 | Lantz |
| D900,073 S | 10/2020 | Lantz |
| D900,074 S | 10/2020 | Lantz |
| 10,827,263 B2 | 11/2020 | Christoph |
| 10,863,270 B1 | 12/2020 | O'Neill |
| 10,930,297 B2 | 2/2021 | Christoph |
| 10,959,018 B1 | 3/2021 | Shi |
| 10,979,805 B2 | 4/2021 | Chowdhary |
| D924,189 S | 7/2021 | Park |
| 11,109,133 B2 | 8/2021 | Lantz |
| D940,116 S | 1/2022 | Cho |
| 2001/0031058 A1 | 10/2001 | Anderson |
| 2002/0015500 A1 | 2/2002 | Belt |
| 2002/0041679 A1 | 4/2002 | Beaucoup |
| 2002/0048377 A1 | 4/2002 | Vaudrey |
| 2002/0064158 A1 | 5/2002 | Yokoyama |
| 2002/0064287 A1 | 5/2002 | Kawamura |
| 2002/0069054 A1 | 6/2002 | Arrowood |
| 2002/0110255 A1 | 8/2002 | Killion |
| 2002/0126861 A1 | 9/2002 | Colby |
| 2002/0131580 A1 | 9/2002 | Smith |
| 2002/0140633 A1 | 10/2002 | Rafii |
| 2002/0146282 A1 | 10/2002 | Wilkes |
| 2002/0149070 A1 | 10/2002 | Sheplak |
| 2002/0159603 A1 | 10/2002 | Hirai |
| 2003/0026437 A1 | 2/2003 | Janse |
| 2003/0053639 A1 | 3/2003 | Beaucoup |
| 2003/0059061 A1 | 3/2003 | Tsuji |
| 2003/0063762 A1 | 4/2003 | Tajima |
| 2003/0063768 A1 | 4/2003 | Cornelius |

(56) References Cited

U.S. PATENT DOCUMENTS

| | | |
|---|---|---|
| 2003/0072461 A1 | 4/2003 | Moorer |
| 2003/0107478 A1 | 6/2003 | Hendricks |
| 2003/0118200 A1 | 6/2003 | Beaucoup |
| 2003/0122777 A1 | 7/2003 | Grover |
| 2003/0138119 A1 | 7/2003 | Pocino |
| 2003/0156725 A1 | 8/2003 | Boone |
| 2003/0161485 A1 | 8/2003 | Smith |
| 2003/0163326 A1 | 8/2003 | Maase |
| 2003/0169888 A1 | 9/2003 | Subotic |
| 2003/0185404 A1 | 10/2003 | Milsap |
| 2003/0198339 A1 | 10/2003 | Roy |
| 2003/0198359 A1 | 10/2003 | Killion |
| 2003/0202107 A1 | 10/2003 | Slattery |
| 2004/0013038 A1 | 1/2004 | Kajala |
| 2004/0013252 A1 | 1/2004 | Craner |
| 2004/0076305 A1 | 4/2004 | Santiago |
| 2004/0105557 A1 | 6/2004 | Matsuo |
| 2004/0125942 A1 | 7/2004 | Beaucoup |
| 2004/0175006 A1 | 9/2004 | Kim |
| 2004/0202345 A1 | 10/2004 | Stenberg |
| 2004/0240664 A1 | 12/2004 | Freed |
| 2005/0005494 A1 | 1/2005 | Way |
| 2005/0041530 A1 | 2/2005 | Goudie |
| 2005/0069156 A1 | 3/2005 | Haapapuro |
| 2005/0094580 A1 | 5/2005 | Kumar |
| 2005/0094795 A1 | 5/2005 | Rambo |
| 2005/0149320 A1 | 7/2005 | Kajala |
| 2005/0157897 A1 | 7/2005 | Saltykov |
| 2005/0175189 A1 | 8/2005 | Lee |
| 2005/0175190 A1 | 8/2005 | Tashev |
| 2005/0213747 A1 | 9/2005 | Popovich |
| 2005/0221867 A1 | 10/2005 | Zurek |
| 2005/0238196 A1 | 10/2005 | Furuno |
| 2005/0270906 A1 | 12/2005 | Ramenzoni |
| 2005/0271221 A1 | 12/2005 | Cerwin |
| 2005/0286698 A1 | 12/2005 | Bathurst |
| 2005/0286729 A1 | 12/2005 | Harwood |
| 2006/0083390 A1 | 4/2006 | Kaderavek |
| 2006/0088173 A1 | 4/2006 | Rodman |
| 2006/0093128 A1 | 5/2006 | Oxford |
| 2006/0098403 A1 | 5/2006 | Smith |
| 2006/0104458 A1 | 5/2006 | Kenoyer |
| 2006/0109983 A1 | 5/2006 | Young |
| 2006/0151256 A1 | 7/2006 | Lee |
| 2006/0159293 A1 | 7/2006 | Azima |
| 2006/0161430 A1 | 7/2006 | Schweng |
| 2006/0165242 A1 | 7/2006 | Miki |
| 2006/0192976 A1 | 8/2006 | Hall |
| 2006/0198541 A1 | 9/2006 | Henry |
| 2006/0204022 A1 | 9/2006 | Hooley |
| 2006/0215866 A1 | 9/2006 | Francisco |
| 2006/0222187 A1 | 10/2006 | Jarrett |
| 2006/0233353 A1 | 10/2006 | Beaucoup |
| 2006/0239471 A1 | 10/2006 | Mao |
| 2006/0262942 A1 | 11/2006 | Oxford |
| 2006/0269080 A1 | 11/2006 | Oxford |
| 2006/0269086 A1 | 11/2006 | Page |
| 2007/0006474 A1 | 1/2007 | Taniguchi |
| 2007/0009116 A1 | 1/2007 | Reining |
| 2007/0019828 A1 | 1/2007 | Hughes |
| 2007/0053524 A1 | 3/2007 | Haulick |
| 2007/0093714 A1 | 4/2007 | Beaucoup |
| 2007/0116255 A1 | 5/2007 | Derkx |
| 2007/0120029 A1 | 5/2007 | Keung |
| 2007/0165871 A1 | 7/2007 | Roovers |
| 2007/0191977 A1* | 8/2007 | Gilbert .................. H04R 3/005 381/119 |
| 2007/0230712 A1 | 10/2007 | Belt |
| 2007/0253561 A1 | 11/2007 | Williams |
| 2007/0269066 A1 | 11/2007 | Derleth |
| 2008/0008339 A1 | 1/2008 | Ryan |
| 2008/0033723 A1 | 2/2008 | Jang |
| 2008/0046235 A1 | 2/2008 | Chen |
| 2008/0056517 A1 | 3/2008 | Algazi |
| 2008/0101622 A1 | 5/2008 | Sugiyama |
| 2008/0130907 A1 | 6/2008 | Sudo |
| 2008/0144848 A1 | 6/2008 | Buck |
| 2008/0168283 A1 | 7/2008 | Penning |
| 2008/0188965 A1 | 8/2008 | Bruey |
| 2008/0212805 A1 | 9/2008 | Fincham |
| 2008/0232607 A1 | 9/2008 | Tashev |
| 2008/0247567 A1 | 10/2008 | Kjolerbakken |
| 2008/0253553 A1 | 10/2008 | Li |
| 2008/0253589 A1 | 10/2008 | Trahms |
| 2008/0259731 A1 | 10/2008 | Happonen |
| 2008/0260175 A1 | 10/2008 | Elko |
| 2008/0279400 A1 | 11/2008 | Knoll |
| 2008/0285772 A1 | 11/2008 | Haulick |
| 2009/0003586 A1 | 1/2009 | Lai |
| 2009/0030536 A1 | 1/2009 | Gur |
| 2009/0052684 A1 | 2/2009 | Ishibashi |
| 2009/0086998 A1 | 4/2009 | Jeong |
| 2009/0087000 A1 | 4/2009 | Ko |
| 2009/0087001 A1 | 4/2009 | Jiang |
| 2009/0094817 A1 | 4/2009 | Killion |
| 2009/0129609 A1 | 5/2009 | Oh |
| 2009/0147967 A1 | 6/2009 | Ishibashi |
| 2009/0150149 A1 | 6/2009 | Cutter |
| 2009/0161880 A1 | 6/2009 | Hooley |
| 2009/0169027 A1 | 7/2009 | Ura |
| 2009/0173030 A1 | 7/2009 | Gulbrandsen |
| 2009/0173570 A1 | 7/2009 | Levit |
| 2009/0226004 A1 | 9/2009 | Soerensen |
| 2009/0233545 A1 | 9/2009 | Sutskover |
| 2009/0237561 A1 | 9/2009 | Kobayashi |
| 2009/0254340 A1 | 10/2009 | Sun |
| 2009/0274318 A1 | 11/2009 | Ishibashi |
| 2009/0310794 A1 | 12/2009 | Ishibashi |
| 2010/0011644 A1 | 1/2010 | Kramer |
| 2010/0034397 A1 | 2/2010 | Nakadai |
| 2010/0074433 A1 | 3/2010 | Zhang |
| 2010/0111323 A1 | 5/2010 | Marton |
| 2010/0111324 A1 | 5/2010 | Yeldener |
| 2010/0119097 A1 | 5/2010 | Ohtsuka |
| 2010/0123785 A1 | 5/2010 | Chen |
| 2010/0128892 A1 | 5/2010 | Chen |
| 2010/0128901 A1 | 5/2010 | Herman |
| 2010/0131749 A1 | 5/2010 | Kim |
| 2010/0142721 A1 | 6/2010 | Wada |
| 2010/0150364 A1 | 6/2010 | Buck |
| 2010/0158268 A1 | 6/2010 | Marton |
| 2010/0165071 A1 | 7/2010 | Ishibashi |
| 2010/0166219 A1 | 7/2010 | Marton |
| 2010/0189275 A1 | 7/2010 | Christoph |
| 2010/0189299 A1 | 7/2010 | Grant |
| 2010/0202628 A1 | 8/2010 | Meyer |
| 2010/0208605 A1 | 8/2010 | Wang |
| 2010/0215184 A1 | 8/2010 | Buck |
| 2010/0215189 A1 | 8/2010 | Marton |
| 2010/0217590 A1 | 8/2010 | Nemer |
| 2010/0245624 A1 | 9/2010 | Beaucoup |
| 2010/0246873 A1 | 9/2010 | Chen |
| 2010/0284185 A1 | 11/2010 | Ngai |
| 2010/0305728 A1 | 12/2010 | Aiso |
| 2010/0314513 A1 | 12/2010 | Evans |
| 2011/0002469 A1 | 1/2011 | Ojala |
| 2011/0007921 A1 | 1/2011 | Stewart |
| 2011/0033063 A1 | 2/2011 | McGrath |
| 2011/0038229 A1 | 2/2011 | Beaucoup |
| 2011/0096136 A1 | 4/2011 | Liu |
| 2011/0096631 A1 | 4/2011 | Kondo |
| 2011/0096915 A1 | 4/2011 | Nemer |
| 2011/0164761 A1 | 7/2011 | McCowan |
| 2011/0194719 A1 | 8/2011 | Frater |
| 2011/0211706 A1 | 9/2011 | Tanaka |
| 2011/0235821 A1 | 9/2011 | Okita |
| 2011/0268287 A1 | 11/2011 | Ishibashi |
| 2011/0311064 A1 | 12/2011 | Teutsch |
| 2011/0311085 A1 | 12/2011 | Stewart |
| 2011/0317862 A1 | 12/2011 | Hosoe |
| 2012/0002835 A1 | 1/2012 | Stewart |
| 2012/0014049 A1 | 1/2012 | Ogle |
| 2012/0027227 A1 | 2/2012 | Kok |
| 2012/0076316 A1 | 3/2012 | Zhu |

(56) References Cited

U.S. PATENT DOCUMENTS

| | | |
|---|---|---|
| 2012/0080260 A1 | 4/2012 | Stewart |
| 2012/0093344 A1 | 4/2012 | Sun |
| 2012/0117474 A1 | 5/2012 | Miki |
| 2012/0128160 A1 | 5/2012 | Kim |
| 2012/0128175 A1 | 5/2012 | Visser |
| 2012/0155688 A1 | 6/2012 | Wilson |
| 2012/0155703 A1 | 6/2012 | Hernandez-Abrego |
| 2012/0163625 A1 | 6/2012 | Siotis |
| 2012/0169826 A1 | 7/2012 | Jeong |
| 2012/0177219 A1 | 7/2012 | Mullen |
| 2012/0182429 A1 | 7/2012 | Forutanpour |
| 2012/0207335 A1 | 8/2012 | Spaanderman |
| 2012/0224709 A1 | 9/2012 | Keddem |
| 2012/0243698 A1 | 9/2012 | Elko |
| 2012/0262536 A1 | 10/2012 | Chen |
| 2012/0288079 A1 | 11/2012 | Burnett |
| 2012/0288114 A1 | 11/2012 | Duraiswami |
| 2012/0294472 A1 | 11/2012 | Hudson |
| 2012/0327115 A1 | 12/2012 | Chhetri |
| 2012/0328142 A1 | 12/2012 | Horibe |
| 2013/0002797 A1 | 1/2013 | Thapa |
| 2013/0004013 A1 | 1/2013 | Stewart |
| 2013/0015014 A1 | 1/2013 | Stewart |
| 2013/0016847 A1 | 1/2013 | Steiner |
| 2013/0028451 A1 | 1/2013 | De Roo |
| 2013/0029684 A1 | 1/2013 | Kawaguchi |
| 2013/0034241 A1 | 2/2013 | Pandey |
| 2013/0039504 A1 | 2/2013 | Pandey |
| 2013/0083911 A1 | 4/2013 | Bathurst |
| 2013/0094689 A1 | 4/2013 | Tanaka |
| 2013/0101141 A1 | 4/2013 | McElveen |
| 2013/0136274 A1 | 5/2013 | Aehgren |
| 2013/0142343 A1 | 6/2013 | Matsui |
| 2013/0147835 A1 | 6/2013 | Hyun |
| 2013/0156198 A1 | 6/2013 | Kim |
| 2013/0182190 A1 | 7/2013 | McCartney |
| 2013/0206501 A1 | 8/2013 | Yu |
| 2013/0216066 A1 | 8/2013 | Yerrace |
| 2013/0226593 A1 | 8/2013 | Magnusson |
| 2013/0251181 A1 | 9/2013 | Stewart |
| 2013/0264144 A1 | 10/2013 | Hudson |
| 2013/0271559 A1 | 10/2013 | Feng |
| 2013/0294616 A1 | 11/2013 | Mulder |
| 2013/0297302 A1 | 11/2013 | Pan |
| 2013/0304476 A1 | 11/2013 | Kim |
| 2013/0304479 A1 | 11/2013 | Teller |
| 2013/0329908 A1 | 12/2013 | Lindahl |
| 2013/0332156 A1 | 12/2013 | Tackin |
| 2013/0336516 A1 | 12/2013 | Stewart |
| 2013/0343549 A1 | 12/2013 | Vemireddy |
| 2014/0003635 A1 | 1/2014 | Mohammad |
| 2014/0010383 A1 | 1/2014 | Mackey |
| 2014/0016794 A1 | 1/2014 | Lu |
| 2014/0029761 A1 | 1/2014 | Maenpaa |
| 2014/0037097 A1 | 2/2014 | Labosco |
| 2014/0050332 A1 | 2/2014 | Nielsen |
| 2014/0072151 A1 | 3/2014 | Ochs |
| 2014/0098233 A1 | 4/2014 | Martin |
| 2014/0098964 A1 | 4/2014 | Rosca |
| 2014/0122060 A1 | 5/2014 | Kaszczuk |
| 2014/0177857 A1 | 6/2014 | Kuster |
| 2014/0233777 A1 | 8/2014 | Tseng |
| 2014/0233778 A1 | 8/2014 | Hardiman |
| 2014/0264654 A1 | 9/2014 | Salmon |
| 2014/0265774 A1 | 9/2014 | Stewart |
| 2014/0270271 A1 | 9/2014 | Dehe |
| 2014/0286518 A1 | 9/2014 | Stewart |
| 2014/0295768 A1 | 10/2014 | Wu |
| 2014/0301586 A1 | 10/2014 | Stewart |
| 2014/0307882 A1 | 10/2014 | Leblanc |
| 2014/0314251 A1 | 10/2014 | Rosca |
| 2014/0341392 A1 | 11/2014 | Lambert |
| 2014/0357177 A1 | 12/2014 | Stewart |
| 2014/0363008 A1 | 12/2014 | Chen |
| 2015/0003638 A1 | 1/2015 | Kasai |
| 2015/0025878 A1 | 1/2015 | Gowreesunker |
| 2015/0030172 A1 | 1/2015 | Gaensler |
| 2015/0033042 A1 | 1/2015 | Iwamoto |
| 2015/0050967 A1 | 2/2015 | Bao |
| 2015/0055796 A1 | 2/2015 | Nugent |
| 2015/0055797 A1 | 2/2015 | Nguyen |
| 2015/0063579 A1 | 3/2015 | Bao |
| 2015/0070188 A1 | 3/2015 | Aramburu |
| 2015/0078581 A1 | 3/2015 | Etter |
| 2015/0078582 A1 | 3/2015 | Graham |
| 2015/0097719 A1 | 4/2015 | Balachandreswaran |
| 2015/0104023 A1 | 4/2015 | Bilobrov |
| 2015/0117672 A1 | 4/2015 | Christoph |
| 2015/0118960 A1 | 4/2015 | Petit |
| 2015/0126255 A1 | 5/2015 | Yang |
| 2015/0156578 A1 | 6/2015 | Alexandridis |
| 2015/0163577 A1 | 6/2015 | Benesty |
| 2015/0185825 A1 | 7/2015 | Mullins |
| 2015/0189423 A1 | 7/2015 | Giannuzzi |
| 2015/0208171 A1 | 7/2015 | Funakoshi |
| 2015/0237424 A1 | 8/2015 | Wilker |
| 2015/0281832 A1 | 10/2015 | Kishimoto |
| 2015/0281833 A1 | 10/2015 | Shigenaga |
| 2015/0281834 A1 | 10/2015 | Takano |
| 2015/0312662 A1 | 10/2015 | Kishimoto |
| 2015/0312691 A1 | 10/2015 | Virolainen |
| 2015/0326968 A1 | 11/2015 | Shigenaga |
| 2015/0341734 A1 | 11/2015 | Sherman |
| 2015/0350621 A1 | 12/2015 | Sawa |
| 2015/0358734 A1 | 12/2015 | Butler |
| 2016/0011851 A1 | 1/2016 | Zhang |
| 2016/0021478 A1 | 1/2016 | Katagiri |
| 2016/0029120 A1 | 1/2016 | Nesta |
| 2016/0031700 A1 | 2/2016 | Sparks |
| 2016/0037277 A1 | 2/2016 | Matsumoto |
| 2016/0055859 A1 | 2/2016 | Finlow-Bates |
| 2016/0080867 A1 | 3/2016 | Nugent |
| 2016/0088392 A1 | 3/2016 | Huttunen |
| 2016/0100092 A1 | 4/2016 | Bohac |
| 2016/0105473 A1 | 4/2016 | Klingbeil |
| 2016/0111109 A1 | 4/2016 | Tsujikawa |
| 2016/0127527 A1 | 5/2016 | Mani |
| 2016/0134928 A1 | 5/2016 | Ogle |
| 2016/0142548 A1 | 5/2016 | Pandey |
| 2016/0142814 A1 | 5/2016 | Deroo |
| 2016/0142815 A1 | 5/2016 | Norris |
| 2016/0148057 A1 | 5/2016 | Oh |
| 2016/0150315 A1 | 5/2016 | Tzirkel-Hancock |
| 2016/0150316 A1 | 5/2016 | Kubota |
| 2016/0155455 A1 | 6/2016 | Ojanperä |
| 2016/0165340 A1 | 6/2016 | Benattar |
| 2016/0173976 A1 | 6/2016 | Podhradsky |
| 2016/0173978 A1 | 6/2016 | Li |
| 2016/0189727 A1 | 6/2016 | Wu |
| 2016/0192068 A1 | 6/2016 | Ng |
| 2016/0196836 A1 | 7/2016 | Yu |
| 2016/0234593 A1 | 8/2016 | Matsumoto |
| 2016/0249132 A1 | 8/2016 | Oliaei |
| 2016/0275961 A1 | 9/2016 | Yu |
| 2016/0295279 A1 | 10/2016 | Srinivasan |
| 2016/0300584 A1 | 10/2016 | Pandey |
| 2016/0302002 A1 | 10/2016 | Lambert |
| 2016/0302006 A1 | 10/2016 | Pandey |
| 2016/0323667 A1 | 11/2016 | Shumard |
| 2016/0323668 A1 | 11/2016 | Abraham |
| 2016/0330545 A1 | 11/2016 | McElveen |
| 2016/0337523 A1 | 11/2016 | Pandey |
| 2016/0353200 A1 | 12/2016 | Bigeh |
| 2016/0357508 A1 | 12/2016 | Moore |
| 2017/0019744 A1 | 1/2017 | Matsumoto |
| 2017/0064451 A1 | 3/2017 | Park |
| 2017/0105066 A1 | 4/2017 | McLaughlin |
| 2017/0134849 A1 | 5/2017 | Pandey |
| 2017/0134850 A1 | 5/2017 | Graham |
| 2017/0164101 A1 | 6/2017 | Rollow, IV |
| 2017/0180861 A1 | 6/2017 | Chen |
| 2017/0206064 A1 | 7/2017 | Breazeal |
| 2017/0230748 A1 | 8/2017 | Shumard |
| 2017/0264999 A1 | 9/2017 | Fukuda |

(56) References Cited

U.S. PATENT DOCUMENTS

| | | |
|---|---|---|
| 2017/0303887 A1 | 10/2017 | Richmond |
| 2017/0308352 A1 | 10/2017 | Kessler |
| 2017/0374454 A1 | 12/2017 | Bernardini |
| 2018/0083848 A1 | 3/2018 | Siddiqi |
| 2018/0102136 A1 | 4/2018 | Ebenezer |
| 2018/0109873 A1 | 4/2018 | Xiang |
| 2018/0115799 A1 | 4/2018 | Thiele |
| 2018/0160224 A1 | 6/2018 | Graham |
| 2018/0196585 A1 | 7/2018 | Densham |
| 2018/0219922 A1 | 8/2018 | Bryans |
| 2018/0227666 A1 | 8/2018 | Barnett |
| 2018/0292079 A1 | 10/2018 | Branham |
| 2018/0310096 A1 | 10/2018 | Shumard |
| 2018/0313558 A1 | 11/2018 | Byers |
| 2018/0338205 A1 | 11/2018 | Abraham |
| 2018/0359565 A1 | 12/2018 | Kim |
| 2019/0042187 A1 | 2/2019 | Truong |
| 2019/0166424 A1 | 5/2019 | Harney |
| 2019/0215540 A1 | 7/2019 | Nicol |
| 2019/0230436 A1 | 7/2019 | Tsingos |
| 2019/0259408 A1 | 8/2019 | Freeman |
| 2019/0268683 A1 | 8/2019 | Miyahara |
| 2019/0295540 A1 | 9/2019 | Grima |
| 2019/0295569 A1 | 9/2019 | Wang |
| 2019/0319677 A1 | 10/2019 | Hansen |
| 2019/0371354 A1 | 12/2019 | Lester |
| 2019/0373362 A1 | 12/2019 | Ansai |
| 2019/0385629 A1 | 12/2019 | Moravy |
| 2019/0387311 A1 | 12/2019 | Schultz |
| 2020/0015021 A1 | 1/2020 | Leppanen |
| 2020/0021910 A1 | 1/2020 | Rollow, IV |
| 2020/0027472 A1 | 1/2020 | Huang |
| 2020/0037068 A1 | 1/2020 | Barnett |
| 2020/0068297 A1 | 2/2020 | Rollow, IV |
| 2020/0100009 A1 | 3/2020 | Lantz |
| 2020/0100025 A1 | 3/2020 | Shumard |
| 2020/0137485 A1 | 4/2020 | Yamakawa |
| 2020/0137510 A1* | 4/2020 | Ikegaya .......... H04M 3/569 |
| 2020/0145753 A1 | 5/2020 | Rollow, IV |
| 2020/0152218 A1 | 5/2020 | Kikuhara |
| 2020/0162618 A1 | 5/2020 | Enteshari |
| 2020/0228663 A1 | 7/2020 | Wells-Rutherford |
| 2020/0251119 A1 | 8/2020 | Yang |
| 2020/0275204 A1 | 8/2020 | Labosco |
| 2020/0278043 A1 | 9/2020 | Cao |
| 2020/0288237 A1 | 9/2020 | Abraham |
| 2021/0012789 A1 | 1/2021 | Husain |
| 2021/0021940 A1 | 1/2021 | Petersen |
| 2021/0044881 A1 | 2/2021 | Lantz |
| 2021/0051397 A1 | 2/2021 | Veselinovic |
| 2021/0098014 A1 | 4/2021 | Tanaka |
| 2021/0098015 A1 | 4/2021 | Pandey |
| 2021/0120335 A1 | 4/2021 | Veselinovic |
| 2021/0200504 A1 | 7/2021 | Park |
| 2021/0375298 A1 | 12/2021 | Zhang |

FOREIGN PATENT DOCUMENTS

| | | |
|---|---|---|
| CA | 2505496 | 10/2006 |
| CA | 2838856 | 12/2012 |
| CA | 2846323 | 9/2014 |
| CN | 1780495 | 5/2006 |
| CN | 101217830 | 7/2008 |
| CN | 101833954 | 9/2010 |
| CN | 101860776 | 10/2010 |
| CN | 101894558 | 11/2010 |
| CN | 102646418 | 8/2012 |
| CN | 102821336 | 12/2012 |
| CN | 102833664 | 12/2012 |
| CN | 102860039 | 1/2013 |
| CN | 104036784 | 9/2014 |
| CN | 104053088 | 9/2014 |
| CN | 104080289 | 10/2014 |
| CN | 104347076 | 2/2015 |
| CN | 104581463 | 4/2015 |
| CN | 105355210 | 2/2016 |
| CN | 105548998 | 5/2016 |
| CN | 106162427 | 11/2016 |
| CN | 106251857 | 12/2016 |
| CN | 106851036 | 6/2017 |
| CN | 107221336 | 9/2017 |
| CN | 107534725 | 1/2018 |
| CN | 108172235 | 6/2018 |
| CN | 109087664 | 12/2018 |
| CN | 208190895 | 12/2018 |
| CN | 109727604 | 5/2019 |
| CN | 110010147 | 7/2019 |
| CN | 306391029 | 3/2021 |
| DE | 2941485 | 4/1981 |
| EM | 0077546430001 | 3/2020 |
| EP | 0381498 | 8/1990 |
| EP | 0594098 | 4/1994 |
| EP | 0869697 | 10/1998 |
| EP | 1180914 | 2/2002 |
| EP | 1184676 | 3/2002 |
| EP | 0944228 | 6/2003 |
| EP | 1439526 | 7/2004 |
| EP | 1651001 | 4/2006 |
| EP | 1727344 | 11/2006 |
| EP | 1906707 | 4/2008 |
| EP | 1952393 | 8/2008 |
| EP | 1962547 | 8/2008 |
| EP | 2133867 | 12/2009 |
| EP | 2159789 | 3/2010 |
| EP | 2197219 | 6/2010 |
| EP | 2360940 | 8/2011 |
| EP | 2710788 | 3/2014 |
| EP | 2721837 | 4/2014 |
| EP | 2772910 | 9/2014 |
| EP | 2778310 | 9/2014 |
| EP | 2942975 | 11/2015 |
| EP | 2988527 | 2/2016 |
| EP | 3035556 | 6/2016 |
| EP | 3131311 | 2/2017 |
| GB | 2393601 | 3/2004 |
| GB | 2446620 | 8/2008 |
| GB | 2563857 | 1/2019 |
| JP | S63144699 | 6/1988 |
| JP | H01260967 | 10/1989 |
| JP | H0241099 | 2/1990 |
| JP | H05260589 | 10/1993 |
| JP | H07336790 | 12/1995 |
| JP | 2518823 | 7/1996 |
| JP | 3175622 | 6/2001 |
| JP | 2003060530 | 2/2003 |
| JP | 2003087890 | 3/2003 |
| JP | 2004349806 | 12/2004 |
| JP | 2004537232 | 12/2004 |
| JP | 2005323084 | 11/2005 |
| JP | 2006094389 | 4/2006 |
| JP | 2006101499 | 4/2006 |
| JP | 4120646 | 8/2006 |
| JP | 4258472 | 8/2006 |
| JP | 4196956 | 9/2006 |
| JP | 2006340151 | 12/2006 |
| JP | 4760160 | 1/2007 |
| JP | 4752403 | 3/2007 |
| JP | 2007089058 | 4/2007 |
| JP | 4867579 | 6/2007 |
| JP | 2007208503 | 8/2007 |
| JP | 2007228069 | 9/2007 |
| JP | 2007228070 | 9/2007 |
| JP | 2007274131 | 10/2007 |
| JP | 2007274463 | 10/2007 |
| JP | 2007288679 | 11/2007 |
| JP | 2008005347 | 1/2008 |
| JP | 2008042754 | 2/2008 |
| JP | 2008154056 | 7/2008 |
| JP | 2008259022 | 10/2008 |
| JP | 2008263336 | 10/2008 |
| JP | 2008312002 | 12/2008 |
| JP | 2009206671 | 9/2009 |
| JP | 2010028653 | 2/2010 |
| JP | 2010114554 | 5/2010 |

(56) References Cited

FOREIGN PATENT DOCUMENTS

| | | |
|---|---|---|
| JP | 2010268129 | 11/2010 |
| JP | 2011015018 | 1/2011 |
| JP | 4779748 | 9/2011 |
| JP | 2012165189 | 8/2012 |
| JP | 5028944 | 9/2012 |
| JP | 5139111 | 2/2013 |
| JP | 5306565 | 10/2013 |
| JP | 5685173 | 3/2015 |
| JP | 2016051038 | 4/2016 |
| KR | 100298300 | 5/2001 |
| KR | 100901464 | 6/2009 |
| KR | 100960781 | 6/2010 |
| KR | 1020130033723 | 4/2013 |
| KR | 300856915 | 5/2016 |
| TW | 201331932 | 8/2013 |
| TW | I484478 | 5/2015 |
| WO | 1997008896 | 3/1997 |
| WO | 1998047291 | 10/1998 |
| WO | 2000030402 | 5/2000 |
| WO | 2003073786 | 9/2003 |
| WO | 2003088429 | 10/2003 |
| WO | 2004027754 | 4/2004 |
| WO | 2004090865 | 10/2004 |
| WO | 2006049260 | 5/2006 |
| WO | 2006071119 | 7/2006 |
| WO | 2006114015 | 11/2006 |
| WO | 2006121896 | 11/2006 |
| WO | 2007045971 | 4/2007 |
| WO | 2008074249 | 6/2008 |
| WO | 2008125523 | 10/2008 |
| WO | 2009039783 | 4/2009 |
| WO | 2009109069 | 9/2009 |
| WO | 2010001508 | 1/2010 |
| WO | 2010091999 | 8/2010 |
| WO | 2010140084 | 12/2010 |
| WO | 2010144148 | 12/2010 |
| WO | 2011104501 | 9/2011 |
| WO | 2012122132 | 9/2012 |
| WO | 2012140435 | 10/2012 |
| WO | 2012160459 | 11/2012 |
| WO | 2012174159 | 12/2012 |
| WO | 2013016986 | 2/2013 |
| WO | 2013182118 | 12/2013 |
| WO | 2014156292 | 10/2014 |
| WO | 2016176429 | 11/2016 |
| WO | 2016179211 | 11/2016 |
| WO | 2017208022 | 12/2017 |
| WO | 2018140444 | 8/2018 |
| WO | 2018140618 | 8/2018 |
| WO | 2018211806 | 11/2018 |
| WO | 2019231630 | 12/2019 |
| WO | 2020168873 | 8/2020 |
| WO | 2020191354 | 9/2020 |
| WO | 211843001 | 11/2020 |

OTHER PUBLICATIONS

"Vsa 2050 II Digitally Steerable Column Speaker," Web page https://www.rcf.it/en_US/products/product-detail/vsa-2050-ii/972389, 15 pages, Dec. 24, 2018.
Advanced Network Devices, IPSCM Ceiling Tile IP Speaker, Feb. 2011, 2 pgs.
Advanced Network Devices, IPSCM Standard 2' by 2' Ceiling Tile Speaker, 2 pgs.
Affes, et al., "A Signal Subspace Tracking Algorithm for Microphone Array Processing of Speech," IEEE Trans. On Speech and Audio Processing, vol. 5, No. 5, Sep. 1997, pp. 425-437.
Affes, et al., "A Source Subspace Tracking Array of Microphones for Double Talk Situations," 1996 IEEE International Conference on Acoustics, Speech, and Signal Processing Conference Proceedings, May 1996, pp. 909-912.
Affes, et al., "An Algorithm for Multisource Beamforming and Multitarget Tracking," IEEE Trans. On Signal Processing, vol. 44, No. 6, Jun. 1996, pp. 1512-1522.
Affes, et al., "Robust Adaptive Beamforming via LMS-Like Target Tracking," Proceedings of IEEE International Conference on Acoustics, Speech and Signal Processing, Apr. 1994, pp. IV-269-IV-272.
Ahonen, et al., "Directional Analysis of Sound Field with Linear Microphone Array and Applications in Sound Reproduction," Audio Engineering Socity, Convention Paper 7329, May 2008, 11 pp.
Alarifi, et al., "Ultra Wideband Indoor Positioning Technologies: Analysis and Recent Advances," Sensors 2016, vol. 16, No. 707, 36 pp.
Amazon webpage for Metalfab MFLCRFG (last visited Apr. 22, 2020) available at <https://www.amazon.com/RETURN-FILTERGRILLE-Drop-Ceiling/dp/B0064Q9A7I/ref=sr 12?dchild=1&keywords=drop+ceiling+return+air+grille&qid=1585862723&s=hi&sr=1-2>, 11 pp.
Armstrong "Walls" Catalog available at <https://www.armstrongceilings.com/content/dam/armstrongceilings/commercial/north america/catalogs/armstrong-ceilings-wallsspecifiers-reference.pdf>, 2019, 30 pp.
Armstrong Tectum Ceiling & Wall Panels Catalog available at <https://www.armstrongceilings.com/content/dam/armstrongceilings/commercial/north-america/brochures/tectum-brochure.pdf>, 2019, 16 pp.
Armstrong Woodworks Concealed Catalog available at <https://sweets.construction.com/swts_content_files/3824/442581.pdf>, 2014, 6 pp.
Armstrong Woodworks Walls Catalog available at <https://www.armstrongceilings.com/pdbupimagesclg/220600.pdf/download/datasheet-woodworks-walls.pdf>, 2019, 2 pp.
Armstrong World Industries, Inc., I-Ceilings Sound Systems Speaker Panels, 2002, 4 pgs.
Armstrong, Acoustical Design: Exposed Structure, available at <https://www.armstrongceilings.com/pdbupimagesclg/217142.pdf/download/acoustical-design-exposed-structurespaces-brochure.pdf>, 2018, 19 pp.
Armstrong, Ceiling Systems, Brochure page for Armstrong Softlook, 1995, 2 pp.
Armstrong, Excerpts from Armstrong 2011-2012 Ceiling Wall Systems Catalog, available at <https://web.archive.org/web/20121116034120/http://www.armstrong.com/commceilingsna/en_us/pdf/ceilings_catalog_screen-2011.pdf>, as early as 2012, 162 pp.
Armstrong, i-Ceilings, Brochure, 2009, 12 pp.
Arnold, et al., "A Directional Acoustic Array Using Silicon Micromachined Piezoresistive Microphones," Journal of the Acoustical Society of America, 113(1), Jan. 2003, 10 pp.
Atlas Sound, I128SYSM IP Compliant Loudspeaker System with Microphone Data Sheet, 2009, 2 pgs.
Atlas Sound, 1'X2' IP Speaker with Micophone for Suspended Ceiling Systems, https://www.atlasied.com/i128sysm, retrieved Oct. 25, 2017, 5 pgs.
Audio Technica, ES945 Omnidirectional Condenser Boundary Microphones, https://eu.audio-technica.com/resources/ES945%20Specifications.pdf, 2007, 1 pg.
Audix Microphones, Audix Introduces Innovative Ceiling Mics, http://audixusa.com/docs_12/latest_news/EFplFKAAkIOtSdolke.shtml, Jun. 2011, 6 pgs.
Audix Microphones, M70 Flush Mount Ceiling Mic, May 2016, 2 pgs.
Automixer Gated, Information Sheet, MIT, Nov. 2019, 9 pp.
AVnetwork, "Top Five Conference Room Mic Myths," Feb. 25, 2015, 14 pp.
Beh, et al., "Combining Acoustic Echo Cancellation and Adaptive Beamforming for Achieving Robust Speech Interface In Mobile Robot," 2008 IEEE/RSJ International Conference on Intelligent Robots and Systems, Sep. 2008, pp. 1693-1698.
Benesty, et al., "A New Class of Doubletalk Detectors Based on Cross-Correlation," IEEE Transactions on Speech and Audio Processing, vol. 8, No. 2, Mar. 2000, pp. 168-172.
Benesty, et al., "Adaptive Algorithms for Mimo Acoustic Echo Cancellation," AI2 Allen Institute for Artifical Intelligence, 2003.
Benesty, et al., "Differential Beamforming," Fundamentals of Signal Enhancement and Array Signal Processing, First Edition, 2017, 39 pp.

(56) References Cited

OTHER PUBLICATIONS

Benesty, et al., "Frequency-Domain Adaptive Filtering Revisited, Generalization to the Multi-Channel Case, and Application to Acoustic Echo Cancellation," 2000 IEEE International Conference on Acoustics, Speech, and Signal Processing Proceedings, Jun. 2000, pp. 789-792.
Benesty, et al., "Microphone Array Signal Processing," Springer, 2010, 20 pp.
Berkun, et al., "Combined Beamformers for Robust Broadband Regularized Superdirective Beamforming," IEEE/ACM Transactions on Audio, Speech, and Language Processing, vol. 23, No. 5, May 2015, 10 pp.
Beyer Dynamic, Classis BM 32-33-34 DE-EN-FR 2016, 1 pg.
Beyer Dynamic, Classis-BM- 33-PZ A1, 2013, 1 pg.
BNO055, Intelligent 9-axis absolute orientation sensor, Data sheet, Bosch, Nov. 2020, 118 pp.
Boyd, et al., Convex Optimization, Mar. 15, 1999, 216 pgs.
Brandstein, et al., "Microphone Arrays: Signal Processing Techniques and Applications," Digital Signal Processing, Springer-Verlag Berlin Heidelberg, 2001, 401 pgs.
Brooks, et al., "A Quantitative Assessment of Group Delay Methods for Identifying Glottal Closures in Voiced Speech," EEE Transaction on Audio, Speech, and Language Processing, vol. 14, No. 2, Mar. 2006, 11 pp.
Bruel & Kjaer, by J.J. Christensen and J. Hald, Technical Review: Beamforming, No. 1, 2004, 54 pgs.
BSS Audio, Soundweb London Application Guides, 2010, 120 pgs.
Buchner, et al., "An Acoustic Human-Machine Interface with Multi-Channel Sound Reproduction," IEEE Fourth Workshop on Multimedia Signal Processing, Oct. 2001, pp. 359-364.
Buchner, et al., "An Efficient Combination of Multi-Channel Acoustic Echo Cancellation with a Beamforming Microphone Array," International Workshop on Hands-Free Speech Communication (HSC2001), Apr. 2001, pp. 55-58.
Buchner, et al., "Full-Duplex Communication Systems Using Loudspeaker Arrays and Microphone Arrays," IEEE International Conference on Multimedia and Expo, Aug. 2002, pp. 509-512.
Buchner, et al., "Generalized Multichannel Frequency-Domain Adaptive Filtering: Efficient Realization and Application to Hands-Free Speech Communication," Signal Processing 85, 2005, pp. 549-570.
Buchner, et al., "Multichannel Frequency-Domain Adaptive Filtering with Application to Multichannel Acoustic Echo Cancellation," Adaptive Signal Processing, 2003, pp. 95-128.
Buck, "Aspects of First-Order Differential Microphone Arrays in the Presence of Sensor Imperfections," Transactions on Emerging Telecommunications Technologies, 13.2, 2002, 8 pp.
Buck, et al., "First Order Differential Microphone Arrays for Automotive Applications," 7th International Workshop on Acoustic Echo and Noise Control, Darmstadt University of Technology, Sep. 10-13, 2001, 4 pp.
Johansson, et al., Speaker Localisation using the Far-Field SRP-PHAT in Conference Telephony, 2002 International Symposium on Intelligent Signal Processing and Communication Systems, 5 pgs.
Johnson, et al., "Array Signal Processing: Concepts and Techniques," p. 59, Prentice Hall, 1993, 3 pp.
Julstrom et al., Direction-Sensitive Gating: A New Approach to Automatic Mixing, J. Audio Eng. Soc., vol. 32, No. 7/8, Jul./Aug. 1984, pp. 490-506.
Kahrs, Ed., The Past, Present, and Future of Audio Signal Processing, IEEE Signal Processing Magazine, Sep. 1997, pp. 30-57.
Kallinger et al., Multi-Microphone Residual Echo Estimation, 2003 IEEE International Conference on Acoustics, Speech, and Signal Processing, Apr. 2003, 4 pgs.
Kammeyer, et al., New Aspects of Combining Echo Cancellers with Beamformers, IEEE International Conference on Acoustics, Speech, and Signal Processing, Mar. 2005, pp. III-137-III-140.
Kellermann, A Self-Steering Digital Microphone Array, 1991 International Conference on Acoustics, Speech, and Signal Processing, Apr. 1991, pp. 3581-3584.

Kellermann, Acoustic Echo Cancellation for Beamforming Microphone Arrays, in Brandstein, ed., Microphone Arrays: Techniques and Applications, 2001, Springer-Verlag Berlin Heidelberg, pp. 281-306.
Kellermann, Integrating Acoustic Echo Cancellation with Adaptive Beamforming Microphone Arrays, Forum Acusticum, Berlin, Mar. 1999, pp. 1-4.
Kellermann, Strategies for Combining Acoustic Echo Cancellation and Adaptive Beamforming Microphone Arrays, 1997 IEEE International Conference on Acoustics, Speech, and Signal Processing, Apr. 1997, 4 pgs.
Klegon, "Achieve Invisible Audio with the MXA910 Ceiling Array Microphone," Jun. 27, 2016, 10 pp.
Knapp, et al., The Generalized Correlation Method for Estimation of Time Delay, IEEE Transactions on Acoustics, Speech, and Signal Processing, vol. ASSP-24, No. 4, Aug. 1976, pp. 320-327.
Kobayashi et al., A Hands-Free Unit with Noise Reduction by Using Adaptive Beamformer, IEEE Transactions on Consumer Electronics, vol. 54, No. 1, Feb. 2008, pp. 116-122.
Kobayashi et al., A Microphone Array System with Echo Canceller, Electronics and Communications in Japan, Part 3, vol. 89, No. 10, Feb. 2, 2006, pp. 23-32.
Kolundžija, et al., "Baffled circular loudspeaker array with broadband high directivity," 2010 IEEE International Conference on Acoustics, Speech and Signal Processing, Dallas, TX, 2010, pp. 73-76.
Lai, et al., "Design of Robust Steerable Broadband Beamformers with Spiral Arrays and the Farrow Filter Structure," Proc. Intl. Workshop Acoustic Echo Noise Control, 2010, 4 pp.
Lebret, et al., Antenna Array Pattern Synthesis via Convex Cptimization, IEEE Trans. on Signal Processing, vol. 45, No. 3, Mar. 1997, pp. 526-532.
LecNet2 Sound System Design Guide, Lectrosonics, Jun. 2, 2006. 28 pages.
Lectrosonics, LecNet2 Sound System Design Guide, Jun. 2006, 28 pgs.
Lee et al., Multichannel Teleconferencing System with Multispatial Region Acoustic Echo Cancellation, International Workshop on Acoustic Echo and Noise Control (IWAENC2003), Sep. 2003, pp. 51-54.
Li, "Broadband Beamforming and Direction Finding Using Concentric Ring Array," Ph.D. Dissertation, University of Missouri-Columbia, Jul. 2005, 163 pp.
Lindstrom et al., An Improvement of the Two-Path Algorithm Transfer Logic for Acoustic Echo Cancellation, IEEE Transactions on Audio, Speech, and Language Processing, vol. 15, No. 4, May 2007, pp. 1320-1326.
Liu et al., Adaptive Beamforming with Sidelobe Control: A Second-Order Cone Programming Approach, IEEE Signal Proc. Letters, vol. 10, No. 11, Nov. 2003, pp. 331-334.
Liu, et al., "Frequency Invariant Beamforming in Subbands," IEEE Conference on Signals, Systems and Computers, 2004, 5 pp.
Liu, et al., "Wideband Beamforming," Wiley Series on Wireless Communications and Mobile Computing, pp. 143-198, 2010, 297 pp.
Lobo, et al., Applications of Second-Order Cone Programming, Linear Algebra and its Applications 284, 1998, pp. 193-228.
Luo et al., Wideband Beamforming with Broad Nulls of Nested Array, Third Int'l Conf. on Info. Science and Tech., Mar. 23-25, 2013, pp. 1645-1648.
Marquardt et al., A Natural Acoustic Front-End for Interactive TV in the EU-Project DICIT, IEEE Pacific Rim Conference on Communications, Computers and Signal Processing, Aug. 2009, pp. 894-899.
Martin, Small Microphone Arrays with Postfilters for Noise and Acoustic Echo Reduction, in Brandstein, ed., Microphone Arrays: Techniques and Applications, 2001, Springer-Verlag Berlin Heidelberg, pp. 255-279.
Maruo et al., On the Optimal Solutions of Beamformer Assisted Acoustic Echo Cancellers, IEEE Statistical Signal Processing Workshop, 2011, pp. 641-644.
McCowan, Microphone Arrays: A Tutorial, Apr. 2001, 36 pgs.
MFLCRFG Datasheet, Metal_Fab Inc., Sep. 7, 2007, 1 p.

(56) References Cited

OTHER PUBLICATIONS

Microphone Array Primer, Shure Question and Answer Page, <https://service.shure.com/s/article/microphone-array-primer?language=en_US>, Jan. 2019, 5 pp.

Milanovic, et al., "Design and Realization of FPGA Platform for Real Time Acoustic Signal Acquisition and Data Processing" 22nd Telecommunications Forum TELFOR, 2014, 6 pp.

Mohammed, A New Adaptive Beamformer for Optimal Acoustic Echo and Noise Cancellation with Less Computational Load, Canadian Conference on Electrical and Computer Engineering, May 2008, pp. 000123-000128.

Mohammed, A New Robust Adaptive Beamformer for Enhancing Speech Corrupted with Colored Noise, AICCSA, Apr. 2008, pp. 508-515.

Mohammed, Real-time Implementation of an efficient RLS Algorithm based on IIR Filter for Acoustic Echo Cancellation, AICCSA, Apr. 2008, pp. 489-494.

Mohan, et al., "Localization of multiple acoustic sources with small arrays using a coherence test," Journal Acoustic Soc Am., 123(4), Apr. 2008, 12 pp.

Moulines, et al., "Pitch-Synchronous Waveform Processing Techniques for Text-to-Speech Synthesis Using Diphones," Speech Communication 9, 1990, 15 pp.

Multichannel Acoustic Echo Cancellation, Obtained from website http://www.buchner-net.com/mcaec.html, Jun. 2011.

Myllyla et al., Adaptive Beamforming Methods for Dynamically Steered Microphone Array Systems, 2008 IEEE International Conference on Acoustics, Speech and Signal Processing, Mar.-Apr. 2008, pp. 305-308.

New Shure Microflex Advance MXA910 Microphone With Intellimix Audio Processing Provides Greater Simplicity, Flexibility, Clarity, Press Release, Jun. 12, 2019, 4 pp.

Nguyen-Ky, et al., "An Improved Error Estimation Algorithm for Stereophonic Acoustic Echo Cancellation Systems," 1st International Conference on Signal Processing and Communication Systems, Dec. 17-19, 2007, 5 pp.

Office Action for Taiwan Patent Application No. 105109900 dated May 5, 2017.

Office Action issued for Japanese Patent Application No. 2015-023781 dated Jun. 20, 2016, 4 pp.

Oh, et al., "Hands-Free Voice Communication in an Automobile With a Microphone Array," 1992 IEEE International Conference on Acoustics, Speech, and Signal Processing, Mar. 1992, pp. 1-281-1-284.

Olszewski, et al., "Steerable Highly Directional Audio Beam Loudspeaker," Interspeech 2005, 4 pp.

Omologo, Multi-Microphone Signal Processing for Distant-Speech Interaction, Human Activity and Vision Summer School (HAVSS), INRIA Sophia Antipolis, Oct. 3, 2012, 79 pgs.

Order, Conduct of the Proceeding, *Clearone, Inc. v. Shure Acquisition Holdings, Inc.*, Nov. 2, 2020, 10 pp.

Pados et al., An Iterative Algorithm for the Computation of the MVDR Filter, IEEE Trans. On Signal Processing, vol. 49, No. 2, Feb. 2001, pp. 290-300.

Double Condenser Microphone SM 69, Datasheet, Georg Neumann GmbH, available at <https://ende.neumann.com/product_files/7453/download>, 8 pp.

Eargle, "The Microphone Handbook," Elar Publ. Co., 1st ed., 1981, 4 pp.

Enright, Notes From Logan, June edition of Scanlines, Jun. 2009, 9 pp.

Fan, et al., "Localization Estimation of Sound Source by Microphones Array," Procedia Engineering 7, 2010, pp. 312-317.

Firoozabadi, et al., "Combination of Nested Microphone Array and Subband Processing for Multiple Simultaneous Speaker Localization," 6th International Symposium on Telecommunications, Nov. 2012, pp. 907-912.

Flanagan et al., Autodirective Microphone Systems, Acustica, vol. 73, 1991, pp. 58-71.

Flanagan, et al., "Computer-Steered Microphone Arrays for Sound Transduction in Large Rooms," J. Acoust. Soc. Am. 78 (5), Nov. 1985, pp. 1508-1518.

Fohhn Audio New Generation of Beam Steering Systems Available Now, audioXpress Staff, May 10, 2017, 8 pp.

Fox, et al., "A Subband Hybrid Beamforming for In-Car Speech Enhancement," 20th European Signal rocessing Conference, Aug. 2012, 5 pp.

Frost, III, An Algorithm for Linearly Constrained Adaptive Array Processing, Proc. IEEE, vol. 60, No. 8, Aug. 1972, pp. 926-935.

Gannot et al., Signal Enhancement using Beamforming and Nonstationarity with Applications to Speech, IEEE Trans. On Signal Processing, vol. 49, No. 8, Aug. 2001, pp. 1614-1626.

Gansler et al., A Double-Talk Detector Based on Coherence, IEEE Transactions on Communications, vol. 44, No. 11, Nov. 1996, pp. 1421-1427.

Gazor et al., Robust Adaptive Beamforming via Target Tracking, IEEE Transactions on Signal Processing, vol. 44, No. 6, Jun. 1996, pp. 1589-1593.

Gazor et al., Wideband Multi-Source Beamforming with Adaptive Array Location Calibration and Direction Finding, 1995 International Conference on Acoustics, Speech, and Signal Processing, May 1995, pp. 1904-1907.

Gentner Communications Corp., AP400 Audio Perfect 400 Audioconferencing System Installation & Operation Manual, Nov. 1998, 80 pgs.

Gentner Communications Corp., XAP 800 Audio Conferencing System Installation & Operation Manual, Oct. 2001, 152 pgs.

Gil-Cacho et al., Multi-Microphone Acoustic Echo Cancellation Using Multi-Channel Warped Linear Prediction of Common Acoustical Poles, 18th European Signal Processing Conference, Aug. 2010, pp. 2121-2125.

Giuliani, et al., "Use of Different Microphone Array Configurations for Hands-Free Speech Recognition in Noisy and Reverberant Environment," IRST-Istituto per la Ricerca Scientifica e Tecnologica, Sep. 22, 1997, 4 pp.

Gritton et al., Echo Cancellation Algorithms, IEEE Assp Magazine, vol. 1, issue 2, Apr. 1984, pp. 30-38.

Hald, et al., "A class of optimal broadband phased array geometries designed for easy construction," 2002 Int'l Congress & Expo. on Noise Control Engineering, Aug. 2002, 6 pp.

Hamalainen, et al., "Acoustic Echo Cancellation for Dynamically Steered Microphone Array Systems," 2007 IEEE Workshop on Applications of Signal Processing to Audio and Acoustics, Oct. 2007, pp. 58-61.

Hayo, Virtual Controls for Real Life, Web page downloaded from https://hayo.io/ on Sep. 18, 2019, 19 pp.

Herbordt et al., A Real-time Acoustic Human-Machine Front-End for Multimedia Applications Integrating Robust Adaptive Beamforming and Stereophonic Acoustic Echo Cancellation, 7th International Conference on Spoken Language Processing, Sep. 2002, 4 pgs.

Herbordt et al., GSAEC—Acoustic Echo Cancellation embedded into the Generalized Sidelobe Canceller, 10th European Signal Processing Conference, Sep. 2000, 5 pgs.

Herbordt et al., Multichannel Bin-Wise Robust Frequency-Domain Adaptive Filtering and Its Application to Adaptive Beamforming, IEEE Transactions on Audio, Speech, and Language Processing, vol. 15, No. 4, May 2007, pp. 1340-1351.

Herbordt, "Combination of Robust Adaptive Beamforming with Acoustic Echo Cancellation for Acoustic Human/Machine Interfaces," Friedrich-Alexander University, 2003, 293 pgs.

Herbordt, et al., Joint Optimization of LCMV Beamforming and Acoustic Echo Cancellation for Automatic Speech Recognition, IEEE International Conference on Acoustics, Speech, and Signal Processing, Mar. 2005, pp. III-77-III-80.

Holm, "Optimizing Microphone Arrays for use in Conference Halls," Norwegian University of Science and Technology, Jun. 2009, 101 pp.

Huang et al., Immersive Audio Schemes: The Evolution of Multiparty Teleconferencing, IEEE Signal Processing Magazine, Jan. 2011, pp. 20-32.

ICONYX Gen5, Product Overview, Renkus-Heinz, Dec. 24, 2018, 2 pp.

(56) References Cited

OTHER PUBLICATIONS

International Search Report and Written Opinion for PCT/US2016/022773 dated Jun. 10, 2016.
International Search Report and Written Opinion for PCT/US2016/029751 dated Nov. 28, 2016, 21 pp.
International Search Report and Written Opinion for PCT/US2018/013155 dated Jun. 8, 2018.
International Search Report and Written Opinion for PCT/US2018/015269 dated Mar. 26, 2018, 12 pp.
International Search Report and Written Opinion for PCT/US2019/031833 dated Jul. 24, 2019, 16 pp.
International Search Report and Written Opinion for PCT/US2019/033470 dated Jul. 31, 2019, 12 pp.
International Search Report and Written Opinion for PCT/US2019/034692 dated Sep. 10, 2019, 11 pp.
International Search Report and Written Opinion for PCT/US2019/051491 dated Dec. 10, 2019, 13 pp.
International Search Report and Written Opinion for PCT/US2019/051989 dated Jan. 10, 2020, 15 pp.
International Search Report and Written Opinion for PCT/US2020/024063 dated Aug. 31, 2020, 18 pp.
International Search Report and Written Opinion for PCT/US2020/035185 dated Sep. 15, 2020, 11 pp.
International Search Report and Written Opinion for PCT/US2020/058385 dated Mar. 31, 2021, 20 pp.
International Search Report and Written Opinion for PCT/US2021/070625 dated Sep. 17, 2021, 17 pp.
International Search Report and Written Opinion for PCT/US2022/014061 dated May 10, 2022, 14 pp.
International Search Report for PCT/US2020/024005 dated Jun. 12, 2020, 12 pp.
InvenSense, "Microphone Array Beamforming," Application Note AN-1140, Dec. 31, 2013, 12 pp.
Invensense, Recommendations for Mounting and Connecting InvenSense MEMS Microphones, Application Note AN-1003, 2013, 11 pp.
Ishii et al., Investigation on Sound Localization using Multiple Microphone Arrays, Reflection and Spatial Information, Japanese Society for Artificial Intelligence, JSAI Technical Report, SIG-Challenge-B202-11, 2012, pp. 64-69.
Ito et al., Aerodynamic/Aeroacoustic Testing in Anechoic Closed Test Sections of Low-speed Wind Tunnels, 16th AIAA/CEAS Aeroacoustics Conference, 2010, 11 pgs.
Johansson et al., Robust Acoustic Direction of Arrival Estimation using Root-SRP-PHAT, a Realtime Implementation, IEEE International Conference on Acoustics, Speech, and Signal Processing, Mar. 2005, 4 pgs.
Invitation to Pay Additional Fees for PCT/US2022/045694 dated Jan. 24, 2023, 13 pp.
Symetrix, Inc., SymNet Network Audio Solutions Brochure, 2008, 32 pgs.
SymNet Network Audio Solutions Brochure, Symetrix, Inc., 2008.
Tan, et al., "Pitch Detection Algorithm: Autocorrelation Method and AMDF," Department of Computer Engineering, Prince of Songkhla University, Jan. 2003, 6 pp.
Tandon, et al., "An Efficient, Low-Complexity, Normalized LMS Algorithm for Echo Cancellation," 2nd Annual IEEE Northeast Workshop on Circuits and Systems, Jun. 2004, pp. 161-164.
Tetelbaum et al., Design and Implementation of a Conference Phone Based on Microphone Array Technology, Proc. Global Signal Processing Conference and Expo (GSPx), Sep. 2004, 6 pgs.
Tiete et al., SoundCompass: A Distributed MEMS Microphone Array-Based Sensor for Sound Source Localization, SENSORS, Jan. 23, 2014, pp. 1918-1949.
TOA Corp., Ceiling Mount Microphone AN-9001 Operating Instructions, http://www.toaelectronics.com/media/an9001_mt1e.pdf, 1 pg.
Togami, et al., "Subband Beamformer Combined with Time-Frequency ICA for Extraction of Target Source Under Reverberant Environments," 17th European Signal Processing Conference, Aug. 2009, 5 pp.

U.S. Appl. No. 16/598,918, filed Oct. 10, 2019, 50 pp.
Van Compernolle, Switching Adaptive Filters for Enhancing Noisy and Reverberant Speech from Microphone Array Recordings, Proc. IEEE Int. Conf. on Acoustics, Speech, and Signal Processing, Apr. 1990, pp. 833-836.
Van Trees, Optimum Array Processing: Part IV of Detection, Estimation, and Modulation Theory, 2002, 54 pgs., pp. i-xxv, 90-95, 201-230.
Van Veen et al., Beamforming: A Versatile Approach to Spatial Filtering, IEEE ASSP Magazine, vol. 5, issue 2, Apr. 1988, pp. 4-24.
Vicente, "Adaptive Array Signal Processing Using the Concentric Ring Array and the Spherical Array," Ph.D. Dissertation, University of Missouri, May 2009, 226 pp.
Wang et al., Combining Superdirective Beamforming and Frequency-Domain Blind Source Separation for Highly Reverberant Signals, EURASIP Journal on Audio, Speech, and Music Processing, vol. 2010, pp. 1-13.
Warsitz, et al., "Blind Acoustic Beamforming Based on Generalized Eigenvalue Decomposition," IEEE Transactions on Audio, Speech and Language Processing, vol. 15, No. 5, 2007, 11 pp.
Weinstein, et al., "LOUD: A 1020-Node Microphone Array and Acoustic Beamformer," 14th International Congress on Sound & Vibration, Jul. 2007, 8 pgs.
Weinstein, et al., "LOUD: A 1020-Node Modular Microphone Array and Beamformer for Intelligent Computing Spaces," MIT Computer Science and Artifical Intelligence Laboratory, 2004, 18 pp.
Wung, "A System Approach to Multi-Channel Acoustic Echo Cancellation and Residual Echo Suppression for Robust Hands-Free Teleconferencing," Georgia Institute of Technology, May 2015, 167 pp.
KAP Audio Conferencing Brochure, ClearOne Communications, Inc., 2002.
Yamaha Corp., MRX7-D Signal Processor Product Specifications, 2016, 12 pgs.
Yamaha Corp., PJP-100H IP Audio Conference System Owner's Manual, Sep. 2006, 59 pgs.
Yamaha Corp., PJP-EC200 Conference Echo Canceller Brochure, Oct. 2009, 2 pgs.
Yan et al., Convex Optimization Based Time-Domain Broadband Beamforming with Sidelobe Control, Journal of the Acoustical Society of America, vol. 121, No. 1, Jan. 2007, pp. 46-49.
Yensen et al., Synthetic Stereo Acoustic Echo Cancellation Structure with Microphone Array Beamforming for VOIP Conferences, 2000 IEEE International Conference on Acoustics, Speech, and Signal Processing, Jun. 2000, pp. 817-820.
Yermeche, et al., "Real-Time DSP Implementation of a Subband Beamforming Algorithm for Dual Microphone Speech Enhancement," 2007 IEEE International Symposium on Circuits and Systems, 4 pp.
Zavarehei, et al., "Interpolation of Lost Speech Segments Using LP-HNM Model with Codebook Post-Processing," IEEE Transactions on Multimedia, vol. 10, No. 3, Apr. 2008, 10 pp.
Zhang, et al., "F-T-LSTM based Complex Network for Joint Acoustic Echo Cancellation and Speech Enhancement," Audio, Speech and Language Processing Group, Jun. 2021, 5 pp.
Zhang, et al., "Multichannel Acoustic Echo Cancelation in Multiparty Spatial Audio Conferencing with Constrained Kalman Filtering," 11th International Workshop on Acoustic Echo and Noise Control, Sep. 14, 2008, 4 pp.
Zhang, et al., "Selective Frequency Invariant Uniform Circular Broadband Beamformer," EURASIP Journal on Advances in Signal Processing, vol. 2010, pp. 1-11.
Zheng, et al., "Experimental Evaluation of a Nested Microphone Array With Adaptive Noise Cancellers," IEEE Transactions on Instrumentation and Measurement, vol. 53, No. 3, Jun. 2004, 10 pp.
Palladino, "This App Lets You Control Your Smarthome Lights via Augmented Reality," Next Reality Mobile AR News, Jul. 2, 2018, 5 pp.
Parikh, et al., "Methods for Mitigating IP Network Packet Loss in Real Time Audio Streaming Applications," GatesAir, 2014, 6 pp.
Pasha, et al., "Clustered Multi-channel Dereverberation for Ad-hoc Microphone Arrays," Proceedings of APSIPA Annual Summit and Conference, Dec. 2015, pp. 274-278.

(56) References Cited

OTHER PUBLICATIONS

Petitioner's Motion for Sanctions, *Clearone, Inc.* v. *Shure Acquisition Holdings, Inc.*, Aug. 24, 2020, 20 pp.

Pettersen, "Broadcast Applications for Voice-Activated Microphones," db, Jul./Aug. 1985, 6 pgs.

Pfeifenberger, et al., "Nonlinear Residual Echo Suppression using a Recurrent Neural Network," Interspeech 2020, 5 pp.

Phoenix Audio Technologies, "Beamforming and Microphone Arrays—Common Myths", Apr. 2016, http://info.phnxaudio.com/blog/microphone-arrays-beamforming-myths-1, 19 pp.

Plascore, PCGA-XR1 3003 Aluminum Honeycomb Data Sheet, 2008, 2 pgs.

Polycom Inc., Vortex EF2211/EF2210 Reference Manual, 2003, 66 pgs.

Polycom, Inc., Polycom SoundStructure C16, C12, C8, and SR12 Design Guide, Nov. 2013, 743 pgs.

Polycom, Inc., Setting Up the Polycom HDX Ceiling Microphone Array Series, https://support.polycom.com/content/dam/polycom-support/products/Telepresence-and-Video/HDX%20Series/setup-maintenance/en/hdx_ceiling_microphone_array_setting_up.pdf, 2010, 16 pgs.

Polycom, Inc., Vortex EF2241 Reference Manual, 2002, 68 pgs.

Polycom, Inc., Vortex EF2280 Reference Manual, 2001, 60 pp.

Pomona, Model 3306, Datasheet, Jun. 9, 1999, 1 p.

Powers, et al., "Proving Adaptive Directional Technology Works: A Review of Studies," The Hearing Review, Apr. 6, 2004, 5 pp.

Prime, et al., "Beamforming Array Optimisation Averaged Sound Source Mapping on a Model Wind Turbine," ResearchGate, Nov. 2014, 10 pp.

Rabinkin et al., Estimation of Wavefront Arrival Delay Using the Cross-Power Spectrum Phase Technique, 132nd Meeting of the Acoustical Society of America, Dec. 1996, pp. 1-10.

Rane Corp., Halogen Acoustic Echo Cancellation Guide, AEC Guide Version 2, Nov. 2013, 16 pgs.

Rao, et al., "Fast LMS/Newton Algorithms for Stereophonic Acoustic Echo Cancelation," IEEE Transactions on Signal Processing, vol. 57, No. 8, Aug. 2009. 12 pages.

Reuven et al., Joint Acoustic Echo Cancellation and Transfer Function GSC in the Frequency Domain, 23rd IEEE Convention of Electrical and Electronics Engineers in Israel, Sep. 2004, pp. 412-415.

Reuven et al., Joint Noise Reduction and Acoustic Echo Cancellation Using the Transfer-Function Generalized Sidelobe Canceller, Speech Communication, vol. 49, 2007, pp. 623-635.

Reuven, et al., "Multichannel Acoustic Echo Cancellation and Noise Reduction in Reverberant Environments Using the Transfer-Function GSC," 2007 IEEE International Conference on Acoustics, Speech and Signal Processing, Apr. 2007, 4 pp.

Ristimaki, Distributed Microphone Array System for Two-Way Audio Communication, Helsinki Univ. of Technology, Master's Thesis, Jun. 15, 2009, 73 pgs.

Rombouts et al., An Integrated Approach to Acoustic Noise and Echo Cancellation, Signal Processing 85, 2005, pp. 849-871.

Sällberg, "Faster Subband Signal Processing," IEEE Signal Processing Magazine, vol. 30, No. 5, Sep. 2013, 6 pp.

Sasaki et al., A Predefined Command Recognition System Using a Ceiling Microphone Array in Noisy Housing Environments, 2008 IEEE/RSJ International Conference on Intelligent Robots and Systems, Sep. 2008, pp. 2178-2184.

Sennheiser, New microphone solutions for ceiling and desk installation, https://en-US.sennheiser.com/news-new-microphone-solutions-for-ceiling-and-desk-installation, Feb. 2011, 2 pgs.

Sennheiser, TeamConnect Ceiling, https://en-us.sennheiser.com/conference-meeting-rooms-teamconnect-ceiling, 2017, 7 pgs.

SerDes, Wikipedia article, last edited on Jun. 25, 2018; retrieved on Jun. 27, 2018, 3 pp., https://en.wikipedia.org/wiki/SerDes.

Sessler, et al., "Directional Transducers," IEEE Transactions on Audio and Electroacoustics, vol. AU-19, No. 1, Mar. 1971, pp. 19-23.

Sessler, et al., "Toroidal Microphones," Journal of Acoustical Society of America, vol. 46, No. 1, 1969, 10 pp.

Shure AMS Update, vol. 1, No. 1, 1983, 2 pgs.

Shure AMS Update, vol. 1, No. 2, 1983, 2 pgs.

Shure AMS Update, vol. 4, No. 4, 1997, 8 pgs.

Shure Debuts Microflex Advance Ceiling and Table Array Microphones, Press Release, Feb. 9, 2016, 4 pp.

Shure Inc., A910-HCM Hard Ceiling Mount, retrieved from website <http://www.shure.com/en-US/products/accessories/a910hcm> on Jan. 16, 2020, 3 pp.

Shure Inc., Microflex Advance, http://www.shure.com/americas/microflex-advance, 12 pgs.

Shure Inc., MX395 Low Profile Boundary Microphones, 2007, 2 pgs.

Shure Inc., MXA910 Ceiling Array Microphone, http://www.shure.com/americas/products/microphones/microflex-advance/mxa910-ceiling-array-microphone, 7 pgs. 2009-2017.

Shure, MXA910 With IntelliMix, Ceiling Array Microphone, available at <https://www.shure.com/en-US/products/microphones/mxa910>, as early as 2020, 12 pp.

Shure, New MXA910 Variant Now Available, Press Release, Dec. 13, 2019, 5 pp.

Shure, Q&A in Response to Recent US Court Ruling on Shure MXA910, Available at <https://www.shure.com/en-US/meta/legal/q-and-a-inresponse-to-recent-us-court-ruling-on-shure-mxa910-response>, As early as 2020, 5 pp.

Shure, RK244G Replacement Screen and Grille, Datasheet, 2013, 1 p.

Shure, The Microflex Advance MXA310 Table Array Microphone, Available at <https://www.shure.com/en-US/products/microphones/mxa310>, As early as 2020, 12 pp.

Signal Processor MRX7-D Product Specifications, Yamaha Corporation, 2016. 12 pages.

Silverman et al., Performance of Real-Time Source-Location Estimators for a Large-Aperture Microphone Array, IEEE Transactions on Speech and Audio Processing, vol. 13, No. 4, Jul. 2005, pp. 593-606.

Sinha, Ch. 9: Noise and Echo Cancellation, in Speech Processing in Embedded Systems, Springer, 2010, pp. 127-142.

SM 69 Stereo Microphone, Datasheet, Georg Neumann GmbH, Available at <https://ende.neumann.com/product_files/6552/download>, 1 p.

Soda et al., Introducing Multiple Microphone Arrays for Enhancing Smart Home Voice Control, The Institute of Electronics, Information and Communication Engineers, Technical Report of IEICE, Jan. 2013, 6 pgs.

Soundweb London Application Guides, BSS Audio, 2010.

Buck, et al., "Self-Calibrating Microphone Arrays for Speech Signal Acquisition: A Systematic Approach," Signal Processing, vol. 86, 2006, pp. 1230-1238.

Burton, et al., "A New Structure for Combining Echo Cancellation and Beamforming in Changing Acoustical Environments," IEEE International Conference on Acoustics, Speech and Signal Processing, 2007, pp. 1-77-1-80.

BZ-3a Installation Instructions, XEDIT Corporation, Available at <chrome-extension://efaidnbmnnnibpcajpcglclefindmkaj/viewer.html?pdfurl=https%3A%2F%2Fwww.servoreelers.com%2Fmt-content%2Fuploads%2F2017%2F05%2Fbz-a-3universal-2017c.pdf&clen=189067&chunk=true>, 1 p.

Cabral, et al., Glottal Spectral Separation for Speech Synthesis, IEEE Journal of Selected Topics in Signal Processing, 2013, 15 pp.

Campbell, "Adaptive Beamforming Using a Microphone Array for Hands-Free Telephony," Virginia Polytechnic Institute and State University, Feb. 1999, 154 pgs.

Canetto, et al., "Speech Enhancement Systems Based on Microphone Arrays," VI Conference of the Italian Society for Applied and Industrial Mathematics, May 27, 2002, 9 pp.

Cao, "Survey on Acoustic Vector Sensor and its Applications in Signal Processing" Proceedings of the 33rd Chinese Control Conference, Jul. 2014, 17 pp.

(56) References Cited

OTHER PUBLICATIONS

Cech, et al., "Active-Speaker Detection and Localization with Microphones and Cameras Embedded into a Robotic Head," IEEE-RAS International Conference on Humanoid Robots, Oct. 2013, pp. 203-210.
Chan, et al., "Uniform Concentric Circular Arrays with Frequency-Invariant Characteristics-Theory, Design, Adaptive Beamforming and DOA Estimation," IEEE Transactions on Signal Processing, vol. 55, No. 1, Jan. 2007, pp. 165-177.
Chau, et al., "A Subband Beamformer on an Ultra Low-Power Miniature DSP Platform," 2002 IEEE International Conference on Acoustics, Speech, and Signal Processing, 4 pp.
Chen, et al., "A General Approach to the Design and Implementation of Linear Differential Microphone Arrays," Signal and Information Processing Association Annual Summit and Conference, 2013 Asia-Pacific, IEEE, 7 pp.
Chen, et al., "Design and Implementation of Small Microphone Arrays," PowerPoint Presentation, Northwestern Polytechnical University and Institut national de la recherche scientifique, Jan. 1, 2014, 56 pp.
Chen, et al., "Design of Robust Broadband Beamformers with Passband Shaping Characteristics using Tikhonov Regularization," IEEE Transactions on Audio, Speech, and Language Processing, vol. 17, No. 4, May 2009, pp. 565-681.
Chou, "Frequency-Independent Beamformer with Low Response Error," 1995 International Conference on Acoustics, Speech, and Signal Processing, pp. 2995-2998, May 9, 1995, 4 pp.
Chu, "Desktop Mic Array for Teleconferencing," 1995 International Conference on Acoustics, Speech, and Signal Processing, May 1995, pp. 2999-3002.
Circuit Specialists webpage for an aluminum enclosure, available at <https://www.circuitspecialists.com/metal-instrument-enclosure-la7.html?otaid=gpl&gclid=EAlalQobChMI2JTw-Ynm6AlVgbblCh3F4QKuEAKYBiABEgJZMPD_BwE>, 3 pp. 2019.
ClearOne Introduces Ceiling Microphone Array With Built-In Dante Interface, Press Release; GlobeNewswire, Jan. 8, 2019, 2 pp.
ClearOne Launches Second Generation of its Groundbreaking Beamforming Microphone Array, Press Release, Acquire Media, Jun. 1, 2016, 2 pp.
ClearOne to Unveil Beamforming Microphone Array with Adaptive Steering and Next Generation Acoustic Echo Cancellation Technology, Press Release, InfoComm, Jun. 4, 2012, 1 p.
ClearOne, Clearly Speaking Blog, "Advanced Beamforming Microphone Array Technology for Corporate Conferencing Systems," Nov. 11, 2013, 5 pp., http://www.clearone.com/blog/advanced-beamforming-microphone-array-technology-for-corporate-conferencing-systems/.
ClearOne, Beamforming Microphone Array, Mar. 2012, 6 pgs.
ClearOne, Ceiling Microphone Array Installation Manual, Jan. 9, 2012, 20 pgs.
ClearOne, Converge/Converge Pro, Manual, 2008, 51 pp.
ClearOne, Professional Conferencing Microphones, Brochure, Mar. 2015, 3 pp.
Coleman, "Loudspeaker Array Processing for Personal Sound Zone Reproduction," Centre for Vision, Speech and Signal Processing, 2014, 239 pp.
Cook, et al., An Alternative Approach to Interpolated Array Processing for Uniform Circular Arrays, Asia-Pacific Conference on Circuits and Systems, 2002, pp. 411-414.
Cox, et al., "Robust Adaptive Beamforming," IEEE Trans. Acoust., Speech, and Signal Processing, vol. ASSP-35, No. 10, Oct. 1987, pp. 1365-1376.

CTG Audio, Ceiling Microphone Ctg CM-01, Jun. 5, 2008, 2 pgs.
CTG Audio, CM-01 & CM-02 Ceiling Microphones Specifications, 2 pgs.
CTG Audio, CM-01 & CM-02 Ceiling Microphones, 2017, 4 pgs.
CTG Audio, CTG FS-400 and RS-800 with "Beamforming" Technology, Datasheet, As early as 2009, 2 pp.
CTG Audio, CTG User Manual for the FS- 400/800 Beamforming Mixers, Nov. 2008, 26 pp.
CTG Audio, Expand Your IP Teleconferencing to Full Room Audio, Obtained from website htt. )://www ct audio com/exand-, our-i -teleconforencino-to-ful-room-audio-while-conquennc.1-echo-cancelation-issues Mull, 2014.
CTG Audio, Frequently Asked Questions, As early as 2009, 2 pp.
CTG Audio, Installation Manual and User Guidelines for the Soundman SM 02 System, May 2001, 29 pp.
CTG Audio, Installation Manual, Nov. 21, 2008, 25 pgs.
CTG Audio, Introducing the CTG FS-400 and FS-800 with Beamforming Technology, As early as 2008, 2 pp.
CTG Audio, Meeting the Demand for Ceiling Mics in the Enterprise 5 Best Practices, Brochure, 2012, 9 pp.
CTG Audio, White on White—Introducing the CM-02 Ceiling Microphone, https://ctgaudio.com/white-on-white-introducing-the-cm-02-ceiling-microphone/, Feb. 20, 2014, 3 pgs.
Dahl et al., Acoustic Echo Cancelling with Microphone Arrays, Research Report 3/95, Univ. of Karlskrona/Ronneby, Apr. 1995, 64 pgs.
Decawave, Application Note: APR001, UWB Regulations, A Summary of Worldwide Telecommunications Regulations governing the use of Ultra-Wideband radio, Version 1.2, 2015, 63 pp.
Desiraju, et al., "Efficient Multi-Channel Acoustic Echo Cancellation Using Constrained Sparse Filter Updates in the Subband Domain," Acoustic Speech Enhancement Research, Sep. 2014, 4 pp.
DiBiase et al., Robust Localization in Reverberent Rooms, in Brandstein, ed., Microphone Arrays: Techniques and Applications, 2001, Springer-Verlag Berlin Heidelberg, pp. 157-180.
Diethorn, "Audio Signal Processing For Next-Generation Multimedia Communication Systems," Chapter 4, 2004, 9 pp.
Digikey webpage for Converta box (last visited Apr. 22, 2020) <https://www.digikey.com/product-detail/en/bud-industries/CU-452-A/377-1969-ND/439257?utm_adgroup=Boxes&utm_source=google&utm_medium=cpc&utm_campaign=Shopping_Boxes%2C%20Enclosures%2C%20Racks_NEW&utm_term=&utm_content=Boxes&gclid=EAlalQobChMI2JTw-Ynm6AlVgbblCh3F4QKuEAkYCSABEgKybPD_BwE>, 3 pp.
Digikey webpage for Pomona Box (last visited Apr. 22, 2020) available at <https://www.digikey.com/product-detail/en/pomonaelectronics/3306/501-2054-ND/736489>, 2 pp.
Digital Wireless Conference System, MCW-D 50, Beyerdynamic Inc., 2009, 18 pp.
Do et al., A Real-Time SRP-PHAT Source Location Implementation using Stochastic Region Contraction (SRC) on a Large-Aperture Microphone Array, 2007 IEEE International Conference on Acoustics, Speech and Signal Processing—ICASSP '07, , Apr. 2007, pp. I-121-I-124.
Dominguez, et al., "Towards an Environmental Measurement Cloud: Delivering Pollution Awareness to the Public," International Journal of Distributed Sensor Networks, vol. 10, Issue 3, Mar. 31, 2014, 17 pp.
Dormehl, "HoloLens concept lets you control your smart home via augmented reality," digitaltrends, Jul. 26, 2016, 12 pp.
International Search Report and Written Opinion for PCT/US2022/045694 dated Mar. 17, 2023, 19 pp.

\* cited by examiner

NETWORKED AUTOMIXER SYSTEMS AND METHODS

CROSS-REFERENCE TO RELATED APPLICATION

This application claims the benefit of U.S. Provisional Patent Application No. 63/262,074, filed Oct. 4, 2021, and is fully incorporated by reference in its entirety herein.

TECHNICAL FIELD

This application generally relates to systems and methods for networked audio automixing. In particular, this application relates to systems and methods for a network of array microphones and an aggregator unit that participate in making a common gating decision, and results in the generation of a final mix audio signal based on submix audio signals from the array microphones, where the submix audio signals are generated based on beamformed signals.

BACKGROUND

Conferencing and presentation environments, such as boardrooms, conferencing settings, and the like, can involve the use of multiple microphones or microphone array lobes for capturing sound from various audio sources. The audio sources may include human speakers, for example. The captured sound may be disseminated to a local audience in the environment through amplified speakers (for sound reinforcement), and/or to others remote from the environment (such as via a telecast and/or a webcast). Each of the microphones or array lobes may form a channel.

Typically, captured sound may also include noise (e.g., undesired non-voice or non-human sounds) in the environment, including constant noises such as from ventilation, machinery, and electronic devices, and errant noises such as sudden, impulsive, or recurrent sounds like shuffling of paper, opening of bags and containers, chewing, typing, etc. To minimize noise in captured sounds, an automixer can be utilized to automatically gate and/or attenuate a particular microphone or array lobe's audio signal to mitigate the contribution of background, static, or stationary noise when it is not capturing human speech or voice. Voice activity detection (VAD) algorithms may also be used to minimize errant noises in captured sound by detecting the presence or absence of human speech or voice. Other noise reduction techniques can reduce certain background, static, or stationary noise, such as fan and HVAC system noise.

Current automixer units typically need to be connected to the audio signals of each individual microphone or array lobe in a system in order to determine which audio signals to gate on or off. The automixer unit then determines a gating decision to decide which audio signals (i.e., channels) to automatically attenuate, for example, by gating off the audio signals that contain only noise. However, as the number of microphones or array lobes becomes greater, the automixer unit may not have sufficient processing resources and/or enough available ports for connections to the microphones. Moreover, a large number of audio signals may need to be routed from the microphones to the automixer unit, which can necessitate additional wiring that can be difficult, impossible, and/or expensive.

In order to support larger numbers of audio signals, some current automixer systems may allow multiple automixer units to be linked together to obtain a coordinated gating decision. In this scenario, each of the automixer units are external to the microphones and generally require that one of the automixer units functions as a decisionmaker to determine the coordinated gating decision. However, such linked systems may require increased processing resources and cost due to the separate and dedicated processing in each of the automixer units. As such, it may be costly, infeasible, and undesirable to perform automixing of large numbers of microphones and/or array lobes using current automixing units and systems.

Furthermore, acoustic echo cancellation (AEC) may be desirable in audio and conferencing systems to, for example, prevent remote far end sounds played in an environment (e.g., speech from a far end participant of a conference played on a loudspeaker) from being sensed by microphones in the local environment and transmitted back to the remote participant. However, it can be computationally intensive and complex to perform AEC on each of a large number of microphone signals. In addition, when microphone signals have already been mixed, applying traditional AEC techniques to a mixed signal may not be as effective in cancelling echo.

Accordingly, there is an opportunity for systems and methods that address these concerns. More particularly, there is an opportunity for systems and methods for a network of array microphones that can each generate a submix audio signal based on beamformed signals and a common gating control signal, and also generate reduced bandwidth metrics based on the beamformed signals; and an aggregator unit that generates a final mix audio signal based on the submix audio signals and also generates the common gating control signal based on the reduced bandwidth metrics. Through the use of such a network of array microphones having the capability to generate submix audio signals and reduced bandwidth metrics, as well as AEC processing capability, array microphone lobe selection can be enhanced while maximizing signal-to-noise ratio, increasing intelligibility, reducing processing resources and signal routing complexity, and increasing overall user satisfaction.

SUMMARY

The invention is intended to solve the above-noted problems by providing systems and methods that are designed to, among other things: (1) utilize a processing unit in each of a network of connected array microphones, where each processing unit determines reduced bandwidth metrics of beamformed signals and generates a submix audio signal based on the beamformed signals and a common gating control signal and/or a common gating decision; (2) aggregate the submix audio signals and reduced bandwidth metrics from each of the array microphones at an aggregator unit, which generates a final mix audio signal based on the submix audio signals and also generates the gating control signal based on the reduced bandwidth metrics; (3) generate echo-cancelled submix audio signals from the beamformed signals using the processing unit of each array microphone, based on the gating control signal and a reference signal; and (4) transmit the submix audio signals, reduced bandwidth metrics, and gating control signal between the array microphones and the aggregator unit over respective visible and/or hidden audio transport channels.

In an embodiment, an audio system may include a plurality of array microphones, and an aggregator unit in communication with the plurality of array microphones. Each of the plurality of array microphones may include a plurality of microphone elements that are each configured to provide a microphone signal, a beamformer in communication with the plurality of microphone elements, and a processing unit. The beamformer may be configured to generate one or more beamformed signals based on the microphone signals from each of the plurality of microphone elements, and each of the one or more beamformed signals may be associated with a lobe of the array microphone. The processing unit may be configured to receive the one or more beamformed signals from the beamformer, determine one or more reduced bandwidth metrics based on the one or more beamformed signals, and generate a submix audio signal based on the one or more beamformed signals and a gating control signal. The aggregator unit may be configured to generate a final mix audio signal based on the submix audio signals received from each of the plurality of array microphones, and generate the gating control signal based on the one or more reduced bandwidth metrics received from each of the plurality of array microphones.

In another embodiment, an audio system may include a plurality of array microphones, and an aggregator unit in communication with the plurality of array microphones. Each of the plurality of array microphones may include a plurality of microphone elements that are each configured to provide a microphone signal, a beamformer in communication with the plurality of microphone elements, and a processing unit. The beamformer may be configured to generate one or more beamformed signals based on the microphone signals from each of the plurality of microphone elements, and each of the one or more beamformed signals may be associated with a lobe of the array microphone. The processing unit may be configured to receive the one or more beamformed signals from the beamformer, determine one or more reduced bandwidth metrics based on the one or more beamformed signals, and generate an echo-canceled submix audio signal based on the one or more beamformed signals, a gating control signal, The processing unit may be configured to receive the one or more beamformed signals from the beamformer, determine one or more reduced bandwidth metrics based on the one or more beamformed signals, and generate a submix audio signal based on the one or more beamformed signals and a gating control signal. The aggregator unit may be configured to generate a final mix audio signal based on the echo-cancelled submix audio signals received from each of the plurality of array microphones, and generate the gating control signal based on the one or more reduced bandwidth metrics received from each of the plurality of array microphones.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
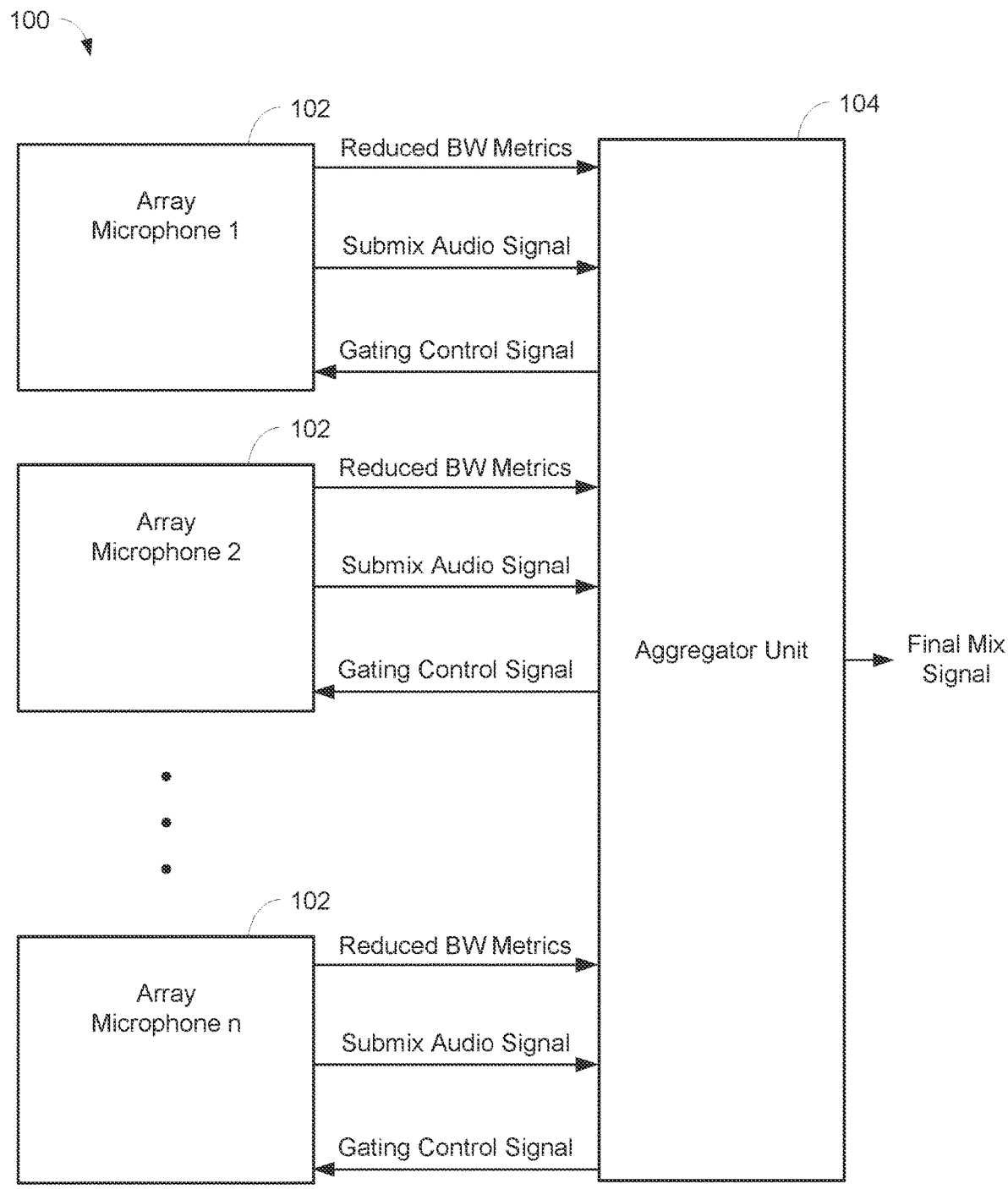
FIG. 1 is a schematic diagram of a system including a plurality of array microphones and an aggregator unit for automixing of beamformed audio signals, in accordance with some embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

The systems and methods described herein can generate a final mix audio signal based on reduced bandwidth metrics and submix audio signals that have been generated by processing units included in a network of connected array microphones. The final mix audio signal can include audio that is generated based on a common gating control signal that takes into account the sound sensed by all of the array microphones. Each array microphone can generate a submix audio signal based on the common gating control signal that indicates the array microphone lobes across the network of array microphones that are gated on or gated off. The systems and methods can enhance the selection of array microphone lobes, which results in improved signal-to-noise ratio, better audio intelligibility, and increased user satisfaction. The final mix audio signal may conform to a desired audio mix such that the audio from certain channels of the array microphones is emphasized while audio from other channels of the array microphones is deemphasized or suppressed.

The reduced bandwidth metrics may be determined based on beamformed signals derived from microphone elements in the array microphones, and the submix audio signals may be generated based on the beamformed signals and a common gating control signal received from an aggregator unit. The aggregator unit can generate the final mix audio signal based on the submix audio signals, and also generate the gating control signal based on reduced bandwidth metrics from each of the array microphones.

By distributing the processing of the beamformed signals locally on each array microphone to produce the reduced bandwidth metrics and submix audio signals, the processing resources needed at the aggregator unit may be reduced. In addition, the routing and connections of signals between the array microphones and the aggregator unit may also be reduced, since only the submix audio signals and reduced bandwidth metrics need to be routed from the array microphones to the aggregator unit, instead of routing signals from all of the individual microphone elements of the array microphones to the aggregator unit. Moreover, the various signals (e.g., submix audio signals, reduced bandwidth metrics, and gating control signal) can be transmitted between the array microphones and the aggregator unit over visible and/or hidden audio transport channels (e.g., audio over IP network transport solutions), which can leverage existing capabilities and ports on the array microphones.

In some embodiments, the processing unit included in each of the array microphones may also process the beamformed signals to generate an echo-cancelled submix audio signal. In these embodiments, the echo-cancelled submix audio signal from each array microphone may be routed to the aggregator unit. By performing acoustic echo cancellation (AEC) locally on the beamformed signals in each array microphone, the need for processing resources in the aggregator unit can be further reduced since the aggregator unit does not need to perform computationally expensive AEC on a large number of signals. In addition, the routing and connection of signals may also be reduced between the array microphones and the aggregator unit in these embodiments.

Figure 2:
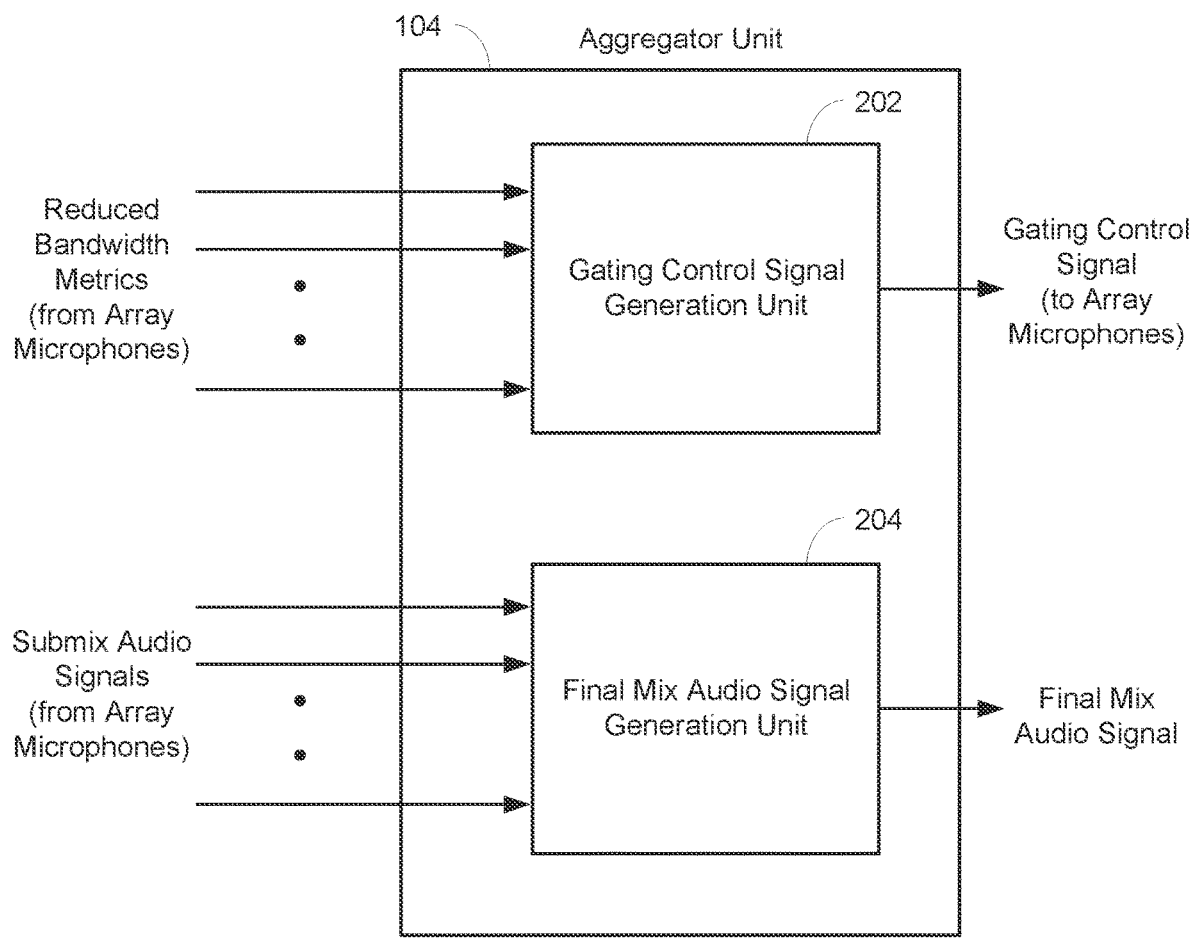
FIG. 2 is a schematic diagram of an aggregator unit for generating a gating control signal from reduced bandwidth metrics received from the array microphones, and generating a final mix audio signal from submix audio signals received from the array microphones, in accordance with some embodiments.

FIG. 1 is a schematic diagram of a system 100 including a plurality of array microphones 102 and an aggregator unit 104 for the automixing of beamformed audio signals. FIG. 2 is a schematic diagram of the aggregator unit 104 for generating a gating control signal from reduced bandwidth metrics received from the array microphones, and generating a final mix audio signal from submix audio signals received from the array microphones.

Environments such as conference rooms, churches, etc. may utilize the system 100 to facilitate communication with persons at a remote location and/or for sound reinforcement, for example. The environment may include desirable audio sources (e.g., human speakers) and/or undesirable audio sources (e.g., noise from ventilation, other persons, audio/visual equipment, electronic devices, etc.). The system 100 may result in the output of a final mix audio signal based on a common gating control signal that takes into account the audio captured by all of the array microphones 102, and attenuates and/or gates off the signals that contain undesirable audio.

Each of the array microphones 102 may detect sound in the environment, and be placed on or in a table, lectern, desktop, wall, ceiling, etc. so that the sound from the audio sources can be detected and captured, such as speech spoken by human speakers. Each of the array microphones may include any number of microphone elements, and be able to form multiple pickup patterns with lobes so that the sound from the audio sources can be detected and captured. Any appropriate number of microphone elements are possible and contemplated in each of the array microphones 102.

The various components included in the system 100 (i.e., the array microphones 102 and the aggregator unit 104) may be implemented using software executable by one or more computing devices, such as a laptop, desktop, tablet, smartphone, etc. Such a computer device may comprise one or more processors, memories, graphics processing units (GPUs), discrete logic circuits, application specific integrated circuits (ASIC), programmable gate arrays (PGA), field programmable gate arrays (FPGA), etc., one or more of which may be configured to perform some or all of the techniques described herein.

As described in more detail below, a processing unit in each of the array microphones 102 may generate reduced bandwidth metrics and a submix audio signal based on beamformed signals that are derived from the microphone elements in the array microphones 102. The submix audio signal may also be based on a gating control signal received from the aggregator unit 104. The submix audio signal generated by a particular array microphone 102 may be a mixture of the beamformed signals of that array microphone 102. The reduced bandwidth metrics and the submix audio signal may be transmitted to the aggregator unit 104 from array microphones 102.

The aggregator unit 104 may receive the submix audio signals from each of the array microphones 102 and generate a final mix audio signal. The aggregator unit 104 may also generate the gating control signal based on the reduced bandwidth metrics received from each of the array microphones 102. In embodiments, other suitable indicators may also be utilized by the aggregator unit 104 in generating the gating control signal. For example, the aggregator unit 104 may generate the gating signal based on an indication that may be determined based on values of one or more sensors. Such sensors may be in communication with the aggregator unit 104. The gating control signal may indicate the lobes of the array microphones 102 that are gated on or gated off. In embodiments, the array microphones 102 may generate echo-cancelled submix audio signals, which array microphones 102 may transmit to the aggregator unit 104. The aggregator unit 104 may generate the final mix audio signal based on these echo-cancelled submix audio signals. In some embodiments, at least some of the functionality of the aggregator unit 104 may be included in one or more of the array microphones 102 instead of as a separate standalone component of the system 100.

The reduced bandwidth metrics and submix audio signals from the array microphone 102, as well as the gating control signal from the aggregator unit 104, may be transmitted over any suitable audio transport channels. In embodiments, the reduced bandwidth metrics, submix audio signals, and gating control signal may be transmitted over audio transport channels and/or be transmitted over hidden audio transport channels. The audio transport channels may be, for example, audio over IP network transport solutions. In embodiments, the audio transport channels utilized for transmission may be encrypted. Hidden audio transport channels may be utilized for certain signals in some embodiments in order to protect the signals from undesired or unauthorized content and/or routing modifications, and also to simplify user interaction with the system so that users only see the channels that can be routed by them.

The reduced bandwidth metrics generated by the array microphones 102 may represent a measurement of the beamformed signals generated by beamformers in the array microphones 102. By using reduced bandwidth metrics, the amount of information representing the beamformed signals may be minimized. For example, the full bandwidth of the beamformed signals does not need to be transmitted from the array microphones 102 to the aggregator unit 104 since the reduced bandwidth metrics may sufficiently represent the beamformed signals. In embodiments, the beamformed signals may have been processed prior to the reduced bandwidth metrics being generated, such as by adjusting their gain and/or equalization. In embodiments, a distinct signal-specific reduced bandwidth metric may be generated for each beamformed signal in an array microphone 102, and all of the signal-specific reduced bandwidth metrics may be combined into the reduced bandwidth metrics that are ultimately transmitted from the array microphone 102 to the aggregator unit 104.

The reduced bandwidth metrics may include, for example, a calculation of the basic level measurement of each of the beamformed signals in the array microphones 102. In an embodiment, the basic level measurement may be calculated by applying a bandpass filter (or other weighting filter) on a beamformed signal, then rectifying and averaging the filtered beamformed signal to obtain a level estimate of the beamformed signal. In embodiments, the reduced bandwidth metrics may include other information derived from the full bandwidth signals or state information. For example, the reduced bandwidth metrics may also include information related to the localization of talkers and/or other desirable sounds in the environment, the deployment of lobes (e.g., locations), Linear Predictive Coding (LPC) coefficients, and/or audio signals transformed with various compression algorithms.

Each of the submix audio signals generated by the array microphones 102 may be a mix of the beamformed signals generated by the beamformer in a particular array microphone 102. The submix audio signals may each take into account the common gating control signal received from the aggregator unit 104 to determine which channels to gate on or off. The submix audio signal may be encoded as a 24-bit audio channel, in some embodiments.

As shown in FIG. 2, the aggregator unit 104 may receive the reduced bandwidth metrics from each of the array microphones 102. The aggregator unit 104 may comprise a gating control signal generation unit 202 and a final mix audio signal generation unit 204. The gating control signal generation unit 202 in the aggregator unit 104 may generate one or more gating control signals based on the received reduced bandwidth metrics. A gating control signal may be transmitted from the gating control signal generation unit 202 of the aggregator unit 104 to each of the array microphones 102. In particular, the gating control signal may be transmitted to all of the array microphones 102, such that each of the array microphones 102 has knowledge of which channels are to be attenuated and/or gated on or off, including channels of array microphones other than the array microphone that receives the gating control signal. In embodiments, there may be a different gating control signal sent to each of the array microphones 102, where each gating control signal is based on a common gating decision calculation made by the gating control signal generation unit 202. These different gating control signals may include reduced information, such as the specific channels or subset of channels for a particular array microphone 102 that are to be attenuated and/or gated on or off.

In embodiments, the gating control signal can denote which channels to gate on to provide captured audio without suppression (or in certain embodiments, with minimal suppression) in response to determining that the captured audio contains human speech and/or according to certain channel selection rules, for example. Similarly, the gating control signal can denote which channels to gate off to reduce the strength of certain captured audio in response to determining that the captured audio in a channel is a background, static, or stationary noise, for example. In embodiments, the gating control signal may be included in one or more frames (e.g., in a signal conforming to the Dante standard and/or another networked audio transport system) that may indicate the gating parameters for each channel.

In embodiments, the gating control signal may indicate a network gain. The gating control signal may be calculated based on calculations of a MAX bus, reverberation inhibit signal, and noise adaptive threshold. The MAX bus may denote the maximum level of a scaled input for any input signal. The reverberation inhibit signal may that track a fraction, such as one fourth, of a maximum of any non-scaled basic level measurements. The noise adaptive threshold may be used to determine if a beamformed audio signal is above a background noise threshold. Exemplary embodiments of the gating control signal, calculating the basic level measurement, generating the submix audio signal, and generating the MAX bus, reverberation inhibit signal, and noise adaptive threshold, as well as exemplary embodiments of other networked automixers, are described in commonly-assigned U.S. Pat. No. 8,644,477 entitled "Digital Microphone Automixer", which is incorporated by reference in its entirety herein.

The aggregator unit 104 may also receive the submix audio signals from each of the array microphones 102. A final mix audio signal generation unit 204 in the aggregator unit 104 may generate the final mix audio signal of the system 100 based on the received submix audio signals. Since the processing unit on each of the array microphones 102 has already taken the common gating control signal into account when generating a respective submix audio signal, the final mix audio signal generation unit 204 can mix the submix audio signals together to generate the final mix audio signal without the need for additional processing. In other words, the aggregator unit 104 may not need to attenuate and/or gate on or off any particular audio channels because the submix audio signals from the array microphones 102 already include contributions from the audio channels that are to be included in the final mix audio signal (as specified by the gating control signal). The final mix audio signal may conform to a desired audio mix such that the audio signals from certain channels of the array microphones 102 are emphasized and the audio signals from other channels of the array microphones 102 are deemphasized or suppressed.

In some embodiments, the aggregator unit 104 may generate the final mix audio signal by also mixing one or more local microphone signals (not shown) with the submix audio signals from each of the array microphones 102. The local microphone signals may be directly transmitted to the aggregator unit 104 in these embodiments. In addition, the aggregator unit 104 may generate the gating control signal based on the reduced bandwidth metrics from each of the array microphones 102 and also based on information derived from the local microphone signal(s).

In embodiments, the aggregator unit 104 may determine one or more latency values that can be transmitted to the array microphones 102, in order to ensure the proper generation of the submix audio signals, reduced bandwidth metrics, gating control signal, and/or other signals. For example, the submix audio signals and reduced bandwidth metrics calculated by each of the array microphones 102 should generally be time aligned with each other when being transmitted to the aggregator unit 104 for processing so that the aggregator unit 104 properly generates the gating control signal. The array microphones 102 can delay the generation and/or transmission of signals based on the latency values received from the aggregator unit 104. Properly generating and transmitting the signals can ensure that the final mix audio signal generated by the aggregator unit 104 is of higher quality (e.g., a channel is gated on at the correct time to include speech from a talker, etc.). The aggregator unit 104 may determine the latency values based on fixed and/or measured delay values related to each of the array microphones 102.

Figure 3:
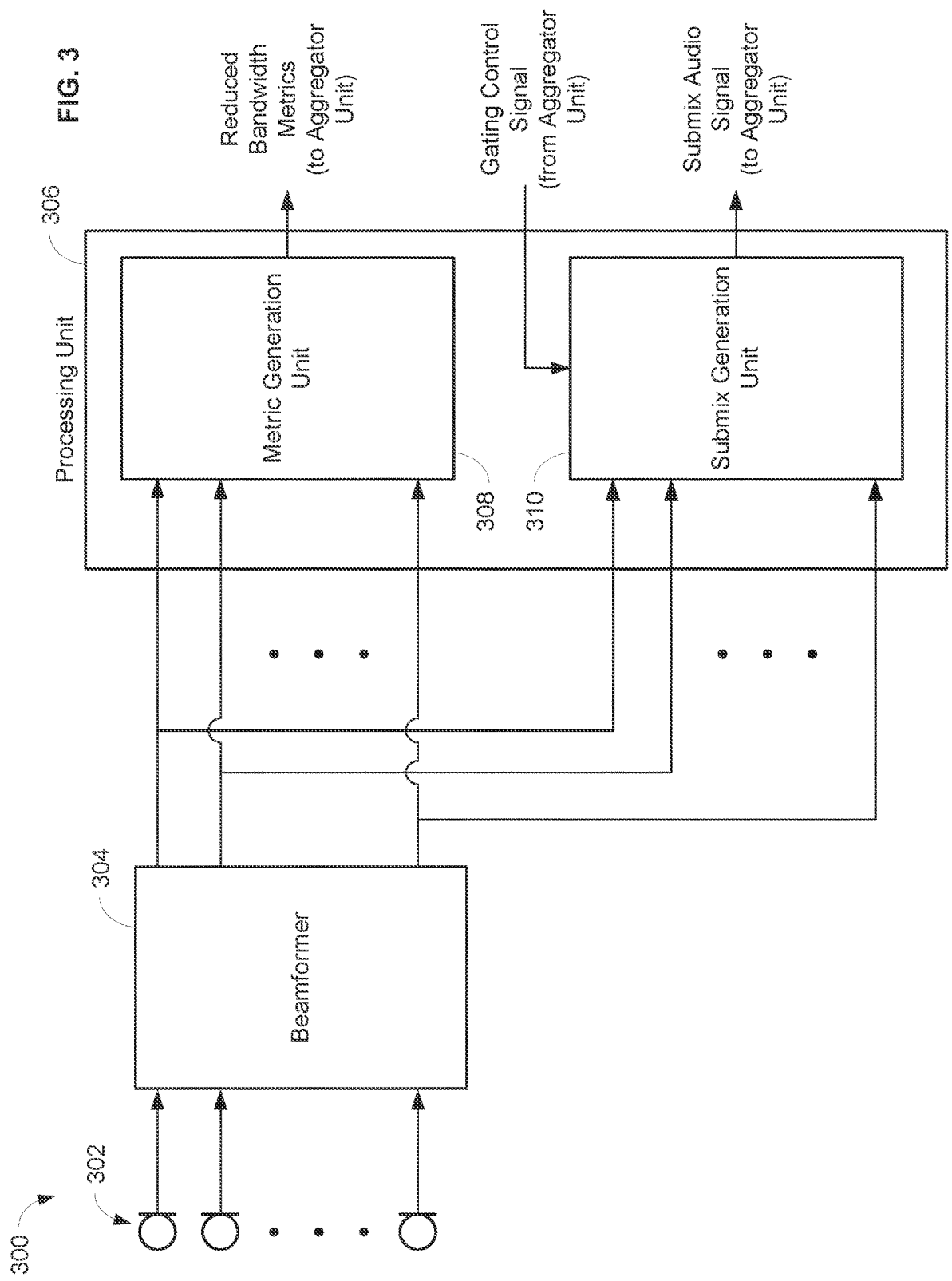
FIG. 3 is a schematic diagram of an array microphone including a beamformer and a processing unit for generating reduced bandwidth metrics from the beamformed signals, and for generating a submix audio signal from the beamformed signals and a gating control signal received from the aggregator unit, in accordance with some embodiments.
Figure 4:
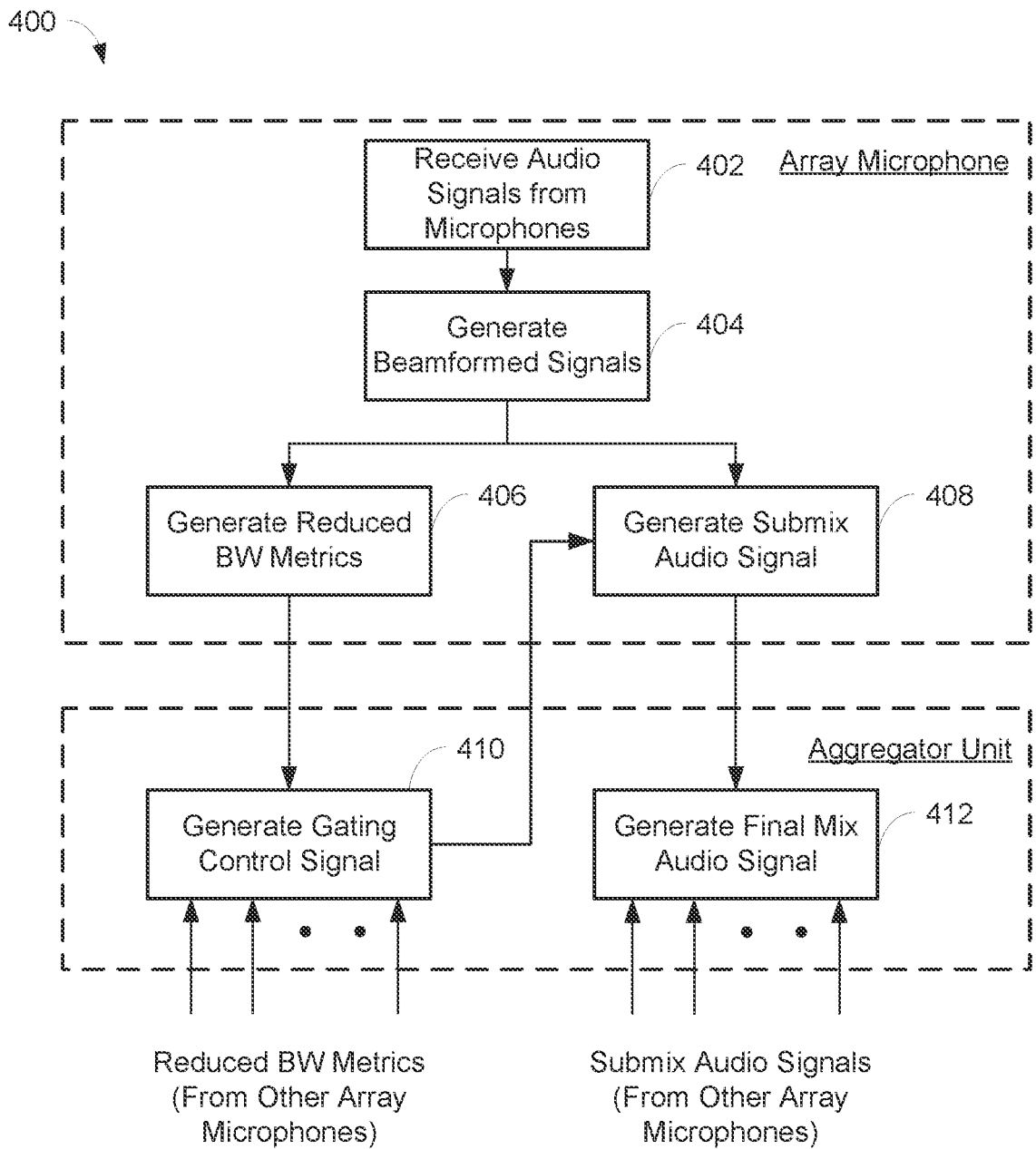
FIG. 4 is a flowchart illustrating operations for generating reduced bandwidth metrics and a submix audio signal using the array microphone of FIG. 3, and for generating a gating control signal and a final mix audio signal using the aggregator unit of FIG. 2, in accordance with some embodiments.

FIG. 3 is a schematic diagram of an array microphone 300 including a beamformer 304 and a processing unit 306 for generating reduced bandwidth metrics from beamformed signals, and for generating a submix audio signal from the beamformed signals and a gating control signal received from the aggregator unit 104. FIG. 4 is a flowchart of a process 400 for generating reduced bandwidth metrics and a submix audio signal using the array microphone 300 of FIG. 3, and for generating a gating control signal and a final mix audio signal using the aggregator unit of FIG. 2. The process 400 as usable with the array microphone 300 is described in more detail below.

Figure 5:
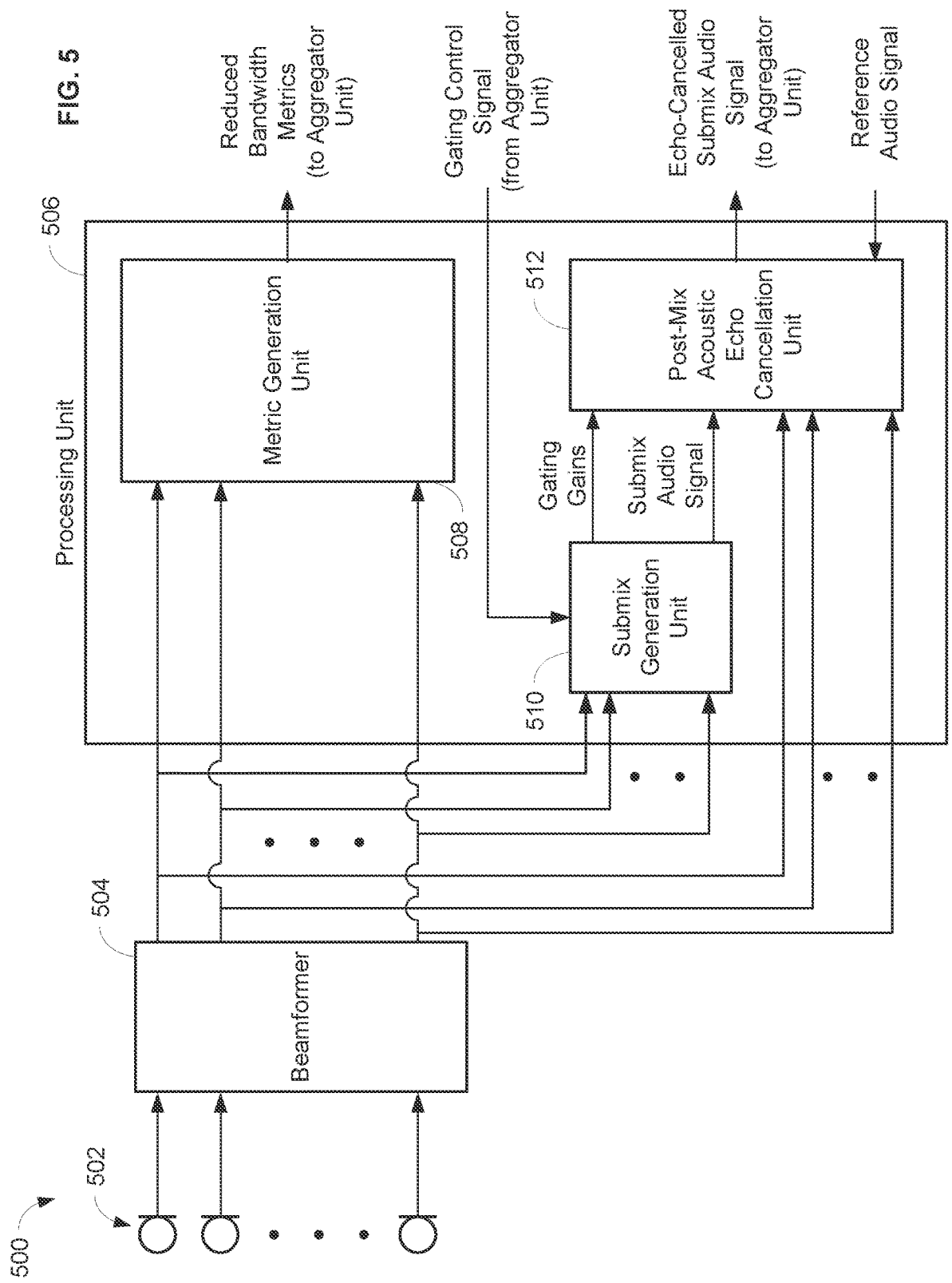
FIG. 5 is a schematic diagram of an array microphone including a beamformer and a processing unit for generating reduced bandwidth metrics from the beamformed signals, and for generating an echo-cancelled submix audio signal from the beamformed signals and a gating control signal received from the aggregator unit, in accordance with some embodiments.
Figure 6:
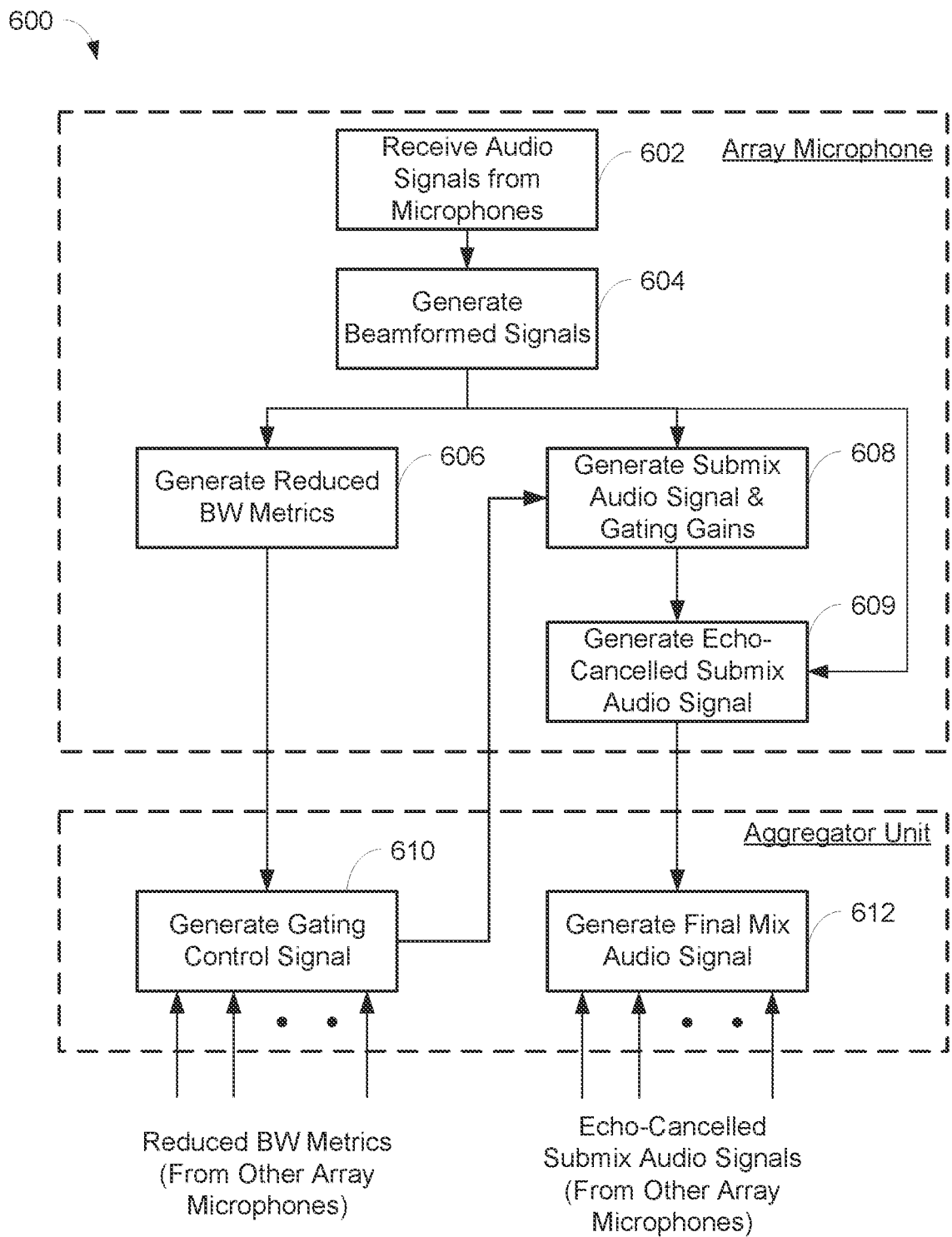
FIG. 6 is a flowchart illustrating operations for generating reduced bandwidth metrics and an echo-cancelled submix audio signal using the array microphone of FIG. 5, and for generating a gating control signal and a final mix audio signal using the aggregator unit of FIG. 2, in accordance with some embodiments.

FIG. 5 is a schematic diagram of an array microphone 500 including a beamformer 504 and a processing unit 506 for generating reduced bandwidth metrics from beamformed signals, and for generating an echo-cancelled submix audio signal from the beamformed signals and a gating control signal received from the aggregator unit 104. FIG. 6 is a flowchart of a process 600 for generating reduced bandwidth metrics and an echo-cancelled submix audio signal using the array microphone 500 of FIG. 5, and for generating a gating control signal and a final mix audio signal using the aggregator unit of FIG. 2. The process 600 as usable with the array microphone 500 is described in more detail below.

One or more processors and/or other processing components (e.g., analog to digital converters, encryption chips, etc.) within the array microphones 300, 500 and aggregator unit 104 may perform any, some, or all of the steps of the processes 400, 600. One or more other types of components (e.g., memory, input and/or output devices, transmitters, receivers, buffers, drivers, discrete components, etc.) may also be utilized in conjunction with the processors and/or other processing components to perform any, some, or all of the steps of the processes 400, 600.

As shown in FIG. 4, steps 402, 404, 406, and 408 of the process 400 may be performed by the microphone elements 302, beamformer 304, and processing unit 306 of the array microphone 300 shown in FIG. 3. The processing unit 306 of the array microphone 300 may include the metric generation unit 308 and the submix generation unit 310. Similarly, steps 602, 604, 606, 608, and 609 of the process 600 shown in FIG. 6 may be performed by the microphone elements 502, beamformer 504, and processing unit 506 of the array microphone 500 shown in FIG. 5. The processing unit 506 of the array microphone 500 may include the metric generation unit 508, the submix generation unit 510, and the post-mix acoustic echo cancellation unit 512. Steps 410, 412, 610, and 612 of the processes 400 and 600 shown in FIGS. 4 and 6 may be performed by the aggregator unit 104 shown in FIG. 2.

At steps 402, 602, the audio signals from each of the microphone elements 302, 502 may be received by the beamformer 304, 504. Each of the microphone elements 302, 502 may detect sound in the environment and convert the sound to an analog or digital audio signal. In some embodiments, the microphone elements 302, 502 may be arranged in concentric rings and/or harmonically nested. The microphone elements 302, 502 may be arranged to be generally symmetric, in some embodiments. In other embodiments, the microphone elements 302, 502 may be arranged asymmetrically or in another arrangement. In further embodiments, the microphone elements 302, 502 may be arranged on a substrate, placed in a frame, or individually suspended, for example. An embodiment of an array microphone is described in commonly assigned U.S. Pat. No. 9,565,493, which is hereby incorporated by reference in its entirety herein. In embodiments, the microphone elements 302, 502 may be unidirectional microphones that are primarily sensitive in one direction. In other embodiments, the microphone elements 302, 502 may have other directionalities or polar patterns, such as cardioid, subcardioid, or omnidirectional, as desired.

The microphone elements 302, 502 may be any suitable type of transducer that can detect the sound from an audio source and convert the sound to an electrical audio signal. In an embodiment, the microphone elements 302, 502 may be micro-electrical mechanical system (MEMS) microphones. In other embodiments, the microphone elements 302, 502 may be condenser microphones, balanced armature microphones, electret microphones, dynamic microphones, and/or other types of microphones. In embodiments, the microphone elements 302, 502 may be arrayed in one dimension or two dimensions.

At step 404, 604, one or more pickup patterns may be formed by the beamformer 304, 504 in the array microphone 300, 500 from the audio signals of the microphone elements 302, 502 that were received at step 402, 602. The beamformer 304, 504 may generate beamformed signals corresponding to each of the pickup patterns at step 404, 604. The pickup patterns may be composed of one or more lobes, e.g., main, side, and back lobes. The beamformer 304, 504 may be any suitable beamformer, such as a delay and sum beamformer or a minimum variance distortionless response (MVDR) beamformer.

The beamformed signals from the beamformer 304, 504 may be transmitted within the array microphone 300, 500 to the processing unit 306, 506. In particular, the beamformed signals from the beamformer 304, 504 may be transmitted to the metric generation unit 308, 508 and to the submix generation unit 310, 510 in the processing unit 306, 506. In addition, in the processing unit 506 of the array microphone 500, the beamformed signals from the beamformer 504 may also be transmitted to the post-mix acoustic echo cancellation unit 512.

At step 406, 606, the metric generation unit 308, 508 of the processing unit 306, 506 may generate reduced bandwidth metrics based on the beamformed signals received from the beamformer 304, 504. The reduced bandwidth metrics may represent a measurement of the beamformed signals, and may include, for example, the basic level measurement of the beamformed signals and/or other information derived from the full bandwidth signals or state information, as described previously. The reduced bandwidth metrics generated at step 406, 606 may be transmitted from the metric generation unit 308, 508 to the aggregation unit 104.

At step 410, 610, the aggregation unit may receive the reduced bandwidth metrics generated at step 406, 606 by each of the array microphones 300, 500, and generate the global gating control signal using the gating control signal generation unit 202. The reduced bandwidth metrics represent the beamformed signals in each of the array microphones 300, 500. The gating control signal can denote which channels of the array microphones 300, 500 to gate on or off, and/or to suppress or not suppress, as described previously. The gating control signal may be transmitted from the aggregator unit 104 to each of the array microphones 300, 500.

At step 408, 608, the submix generation unit 310, 510 may receive the beamformed signals from the beamformer 304, 504 (generated at step 404, 604) and also receive the gating control signal from the aggregator unit 104 (generated at step 410, 610). The submix generation unit 310, 510 may generate a submix audio signal at step 408, 608 based on the beamformed signals and the gating control signal. In particular, the submix generation unit 310, 510 may use the information in the gating control signal to apply processing to the beamformed signals in the array microphone 300, 500 to attenuate and/or gate them on or off.

In an embodiment including the array microphone 300, the submix audio signal generated at step 408 by the submix generation unit 310 may be transmitted to the aggregator unit 104. In some embodiments, the submix audio signal generated at step 408 may be processed for noise reduction, gain adjustment, acoustic echo cancellation, and/or other signal processing (e.g., by an array microphone, such as array microphone 300 and/or 500) before being transmitted to the aggregator unit 104. At step 412, the aggregator unit 104 may receive the submix audio signal from each of the array microphones 300 and generate the final mix audio signal. The final mix audio signal may reflect the desired audio mix of beamformed signals/channels from the array microphones 300 (as embodied in the submix audio signals), and as specified by the gating control signal. In embodiments, the final mix audio signal may be transmitted to a remote location (e.g., far end of a conference) and/or be played in the environment for sound reinforcement, for example. In some embodiments, the final mix audio signal generated at step 412 may be processed for noise reduction, gain adjustment, acoustic echo cancellation, and/or other signal processing.

In another embodiment including the array microphone 500, the submix audio signal generated at step 608 by the submix generation unit 510 may be transmitted to post-mix acoustic echo cancellation unit 512 in the processing unit 506 of the array microphone 500. The submix generation unit 510 may have also determined the gating gains of the submix audio signal that are used in generating the submix audio signal at step 608. In embodiments, the gating control signal generation unit 202 may perform a number of calculations that are used to determine the gating gains, and the results of these calculations may be transmitted as part of the gating control signal to the submix generation unit 510 from the gating control signal generation unit 202. In other embodiments, the gating control signal generation unit 202 may determine the gating gains of the submix audio signal based on the results of the calculations performed in the gating control signal generation unit 202, and the gating gains may be transmitted as part of the gating control signal to the submix generation unit 510 from the gating control signal generation unit 202. The submix audio signal, gating gains of the submix audio signal, the beamformed signals, and a reference audio signal may be used by the post-mix acoustic echo cancellation unit 512 to generate an echo-cancelled submix audio signal at step 609.

The gating gains are applied to each of the beamformed audio signals when they are summed into the submix audio signal used in the post-mix acoustic echo cancellation unit 512. In embodiments, the gating control signal generation unit 202 may calculate a number of open microphone attenuation (NOMA) scaling factor and an off attenuation scaling factor. The NOMA scaling factor and the off attenuation scaling factor may be transmitted as part of the gating control signal from the gating control signal generation unit 202. The per-channel gating gain may be generated by the submix generation unit 510 by multiplying the NOMA scaling factor and the off attenuation scaling factor after applying averaging/smoothing filtering.

Accordingly, the submix generation unit 510 of the processing unit 506 in the array microphone 500 may provide the gating gains that have been applied to each channel to the post-mix acoustic echo cancellation unit 512. Furthermore, the gating gains are based on a network-wide common gating decision, as opposed to being based on a local gating decision. In this way, the post-mix acoustic echo cancellation unit 512 in combination with the submix generation unit 510 may have improved performance since their combined behavior may be influenced by channels from all of the array microphones in the system.

The echo-cancelled submix audio signal may mitigate the sound in the reference audio signal. The reference audio signal may include, for example, the sound received from a remote location that is being played on a loudspeaker in the local environment. Another exemplary reference audio signal may be locally generated or played sounds that may be picked up by local microphones and are desired to be removed from near end speech. A further exemplary reference audio signal may be the sound of a near end talker in a different part of the room that has been amplified into a loudspeaker near the array microphone. In some embodiments, different reference audio signals may be transmitted to different array microphones 500 in the system.

In particular, the post-mix acoustic echo cancellation unit 512 may generate the echo-cancelled submix audio signal based on the submix audio signal from the submix generation unit 510, information gathered from the beamformed audio signals, and the reference audio signal. The submix audio signal and the beamformed signals may be processed in the frequency domain by the post-mix acoustic echo cancellation unit 512, in order to generate the echo-cancelled submix audio signal. The post-mix acoustic echo cancellation unit 512 may include a signal selection mechanism that is configured to select at least one of the beamformed signals such that the echo-cancelled submix audio signal is generated based on the submix audio signal, information gathered from the selected beamformed signal, and the reference audio signal. Information gathered from the selected beamformed signal may include, for example, measurements of the background error power and hidden error power of the selected beamformed signal. The signal selection mechanism may include a switch, a mixer that could select a particular beamformed signal (by attenuating some or all of the other beamformed signals), and/or another suitable signal selection mechanism. Exemplary embodiments of post-mix acoustic echo cancellation systems and method are described in commonly-assigned U.S. Pat. No. 10,367,948 entitled "Post-Mixing Acoustic Echo Cancellation Systems and Methods", which is incorporated by reference in its entirety herein. In some embodiments, the echo-cancelled submix audio signal may be further processed to reduce noise, prior to being transmitted to the aggregator unit 104.

At step 612, the aggregator unit 104 may receive the echo-cancelled submix audio signal from each of the array microphones 500 and generate the final mix audio signal. The final mix audio signal may reflect the desired audio mix of beamformed signals/channels from the array microphones 500 (as embodied in the echo-cancelled submix audio signals), and as specified by the gating control signal. In embodiments, the final mix audio signal may be transmitted to a remote location (e.g., far end of a conference) and/or be played in the environment for sound reinforcement, for example. Since the final mix audio signal generated at step 612 includes the echo-cancelled submix audio signals from each of the array microphones 500, the final mix audio signal can be transmitted to a remote location, for example, without the undesirable echo of persons at the remote location hearing their own speech and sound.

Figure 7:
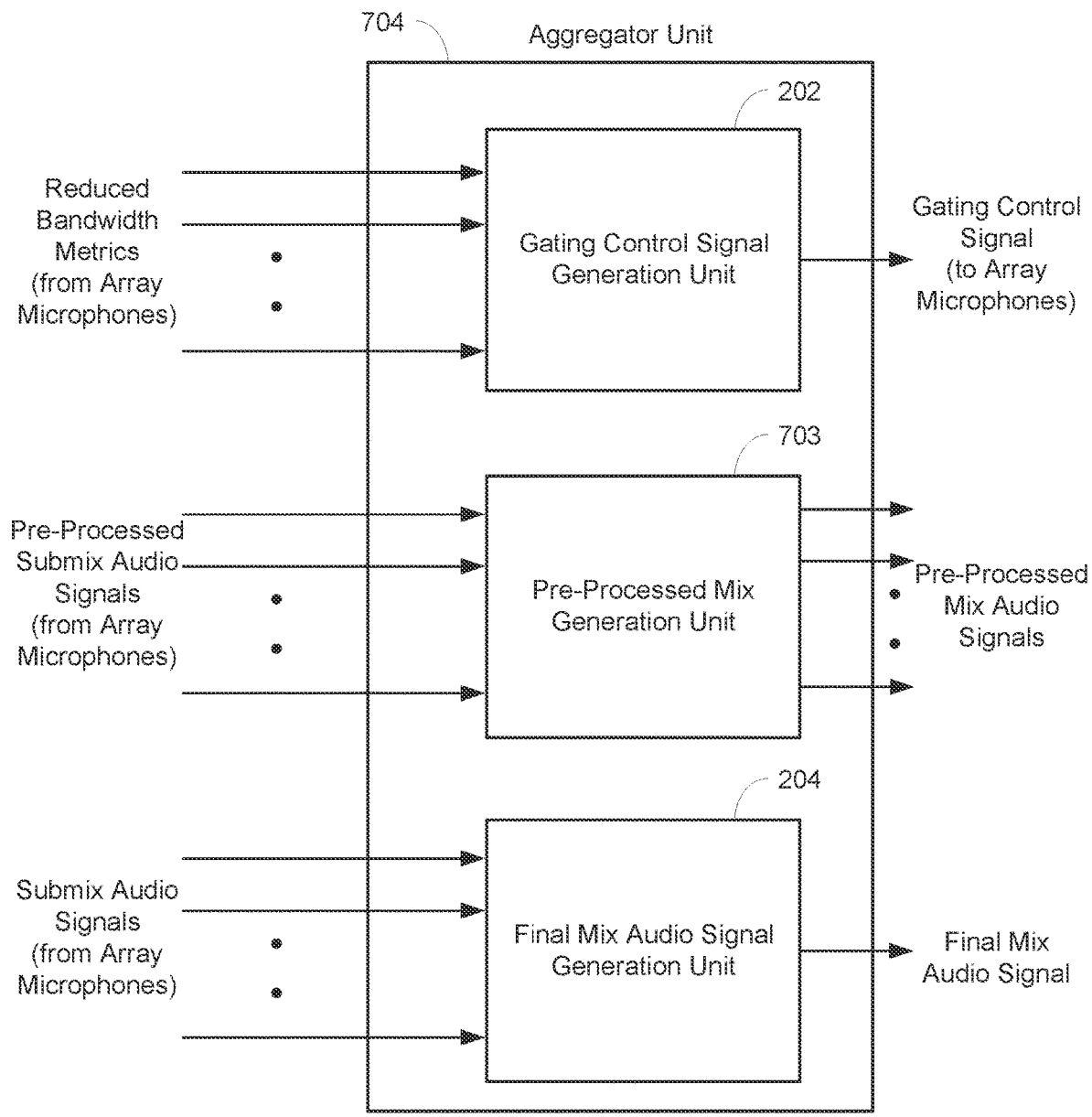
FIG. 7 is a schematic diagram of an aggregator unit for generating a gating control signal from reduced bandwidth metrics received from the array microphones, generating pre-processed mix audio signals, and generating a final mix audio signal from submix audio signals received from the array microphones, in accordance with some embodiments.
Figure 8:
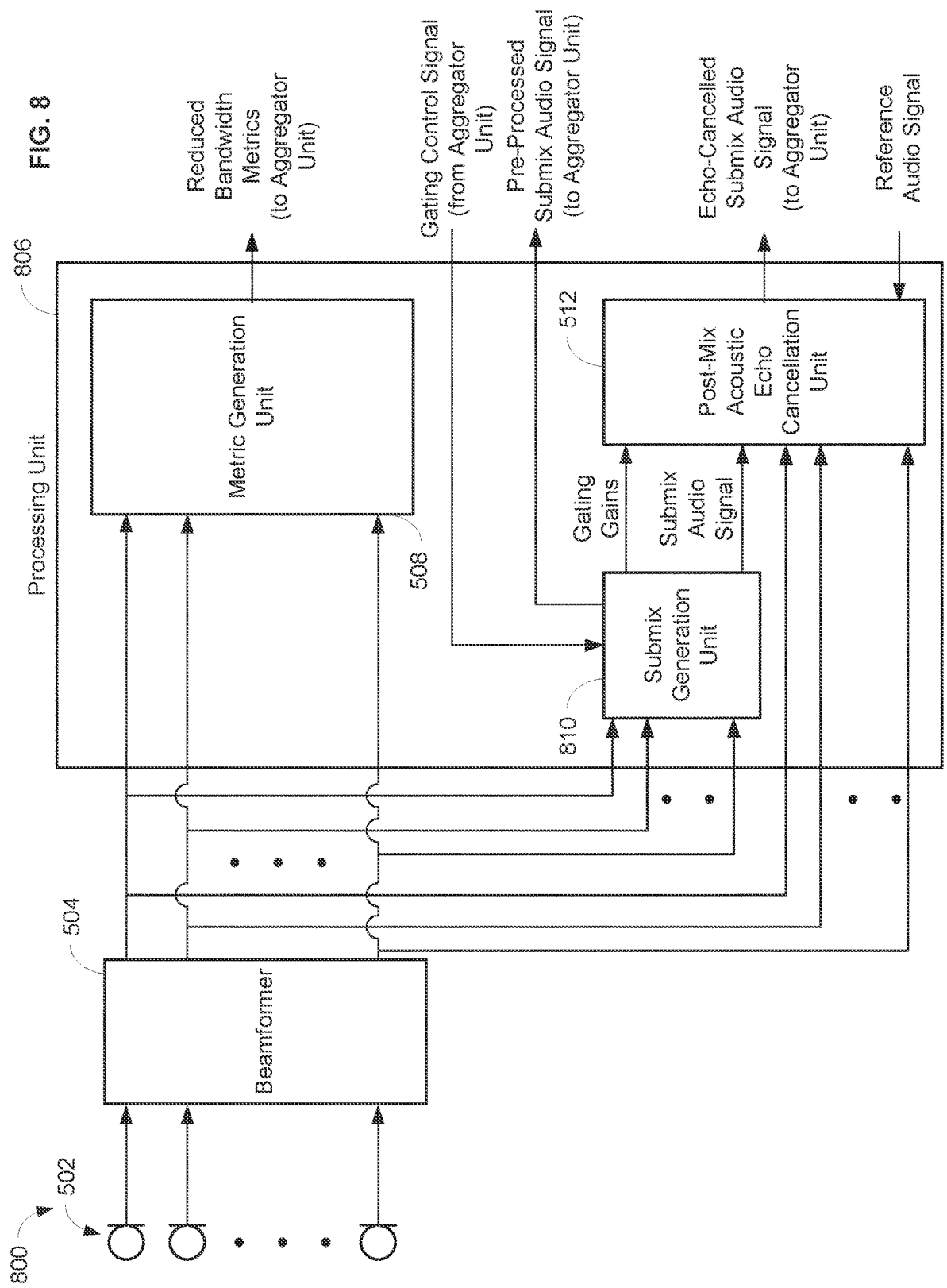
FIG. 8 is a schematic diagram of an array microphone including a beamformer and a processing unit for generating reduced bandwidth metrics from the beamformed signals, for generating a pre-processed submix audio signal, and for generating an echo-cancelled submix audio signal from the beamformed signals and a gating control signal received from the aggregator unit, in accordance with some embodiments.
Figure 9:
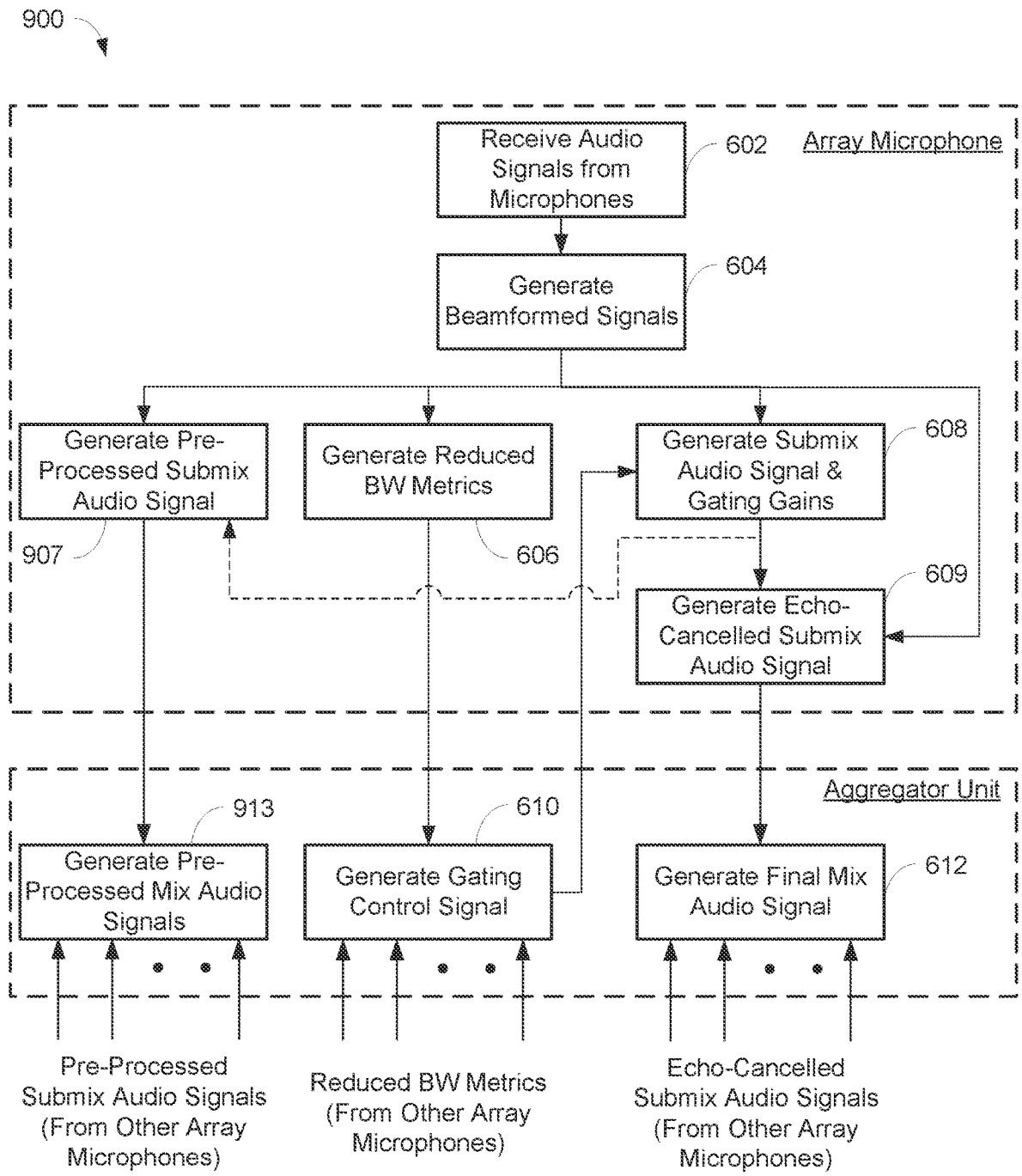
FIG. 9 is a flowchart illustrating operations for generating reduced bandwidth metrics, a pre-processed submix audio signal, and an echo-cancelled submix audio signal using the array microphone of FIG. 8, and for generating a gating control signal, pre-processed mix audio signals, and a final mix audio signal using the aggregator unit of FIG. 7, in accordance with some embodiments.

A further embodiment enables the generation of gated or ungated pre-processed mix audio signals that can be used for local sound reinforcement, for example. This embodiment includes an aggregator unit 704 of FIG. 7 in communication with an array microphone 800 with a processing unit 806 and a submix generation unit 810 of FIG. 8, and is further described with reference to the process 900 of FIG. 9. For simplicity, in FIGS. 7-8, the functionality of other components of the aggregator unit 704 and array microphone 800 that are not discussed below are as described previously. Similarly, the functionality of other steps in the process 900 that are not discussed below are also as described previously.

The processing unit 806 of the array microphone 800 may include a submix generation unit 810 that also generates a pre-processed submix audio signal from the beamformed signals received from the beamformer 504, such as at step 907 of the process 900. The pre-processed submix audio signal from the array microphone 800 may be gated or ungated, and may or may not have been processed for noise reduction, gain adjustment, and/or acoustic echo cancellation purposes. When the pre-processed submix audio signal is gated, then the submix generation unit 810 may generate the gated pre-processed submix audio signal from the beamformed signals and based on gating gains (such as those generated at step 608). The pre-processed submix audio signal may be transmitted from the submix generation unit 810 to the aggregator unit 704.

The aggregator unit 704 may generate the pre-processed mix audio signals using a pre-processed mix generation unit 703, such as at step 913 of the process 900. The aggregator unit 704 may also receive pre-processed submix audio signals from other array microphones 800 in the system in order to generate the pre-processed mix audio signals. In embodiments, the pre-processed mix audio signals may be gated or ungated, depending on whether the pre-processed submix audio signals received from the array microphones 800 are gated or ungated. The pre-processed mix audio signals may be a desired audio mix of the pre-processed submix audio signals from the array microphones 800. In embodiments, the pre-processed mix audio signals may be played in the environment for local sound reinforcement, for example.

In general, a computer program product in accordance with the embodiments includes a computer usable storage medium (e.g., standard random access memory (RAM), an optical disc, a universal serial bus (USB) drive, or the like) having computer-readable program code embodied therein, wherein the computer-readable program code is adapted to be executed by a processor (e.g., working in connection with an operating system) to implement the methods described below. In this regard, the program code may be implemented in any desired language, and may be implemented as machine code, assembly code, byte code, interpretable source code or the like (e.g., via C, C++, Java, ActionScript, Objective-C, JavaScript, CSS, XML, and/or others).

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. An audio system, comprising:
  (A) a plurality of array microphones each comprising:
    a plurality of microphone elements, wherein each of the plurality of microphone elements is configured to provide a microphone signal;
    a beamformer in communication with the plurality of microphone elements, wherein the beamformer is configured to generate one or more beamformed signals based on the microphone signals from each of the plurality of microphone elements, and wherein each of the one or more beamformed signals is associated with a lobe of the array microphone; and
    a processing unit configured to receive the one or more beamformed signals from the beamformer, determine one or more reduced bandwidth metrics based on the one or more beamformed signals, and generate a submix audio signal based on the one or more beamformed signals and a gating control signal; and
  (B) an aggregator unit in communication with the plurality of array microphones, wherein the aggregator unit is configured to:
    generate a final mix audio signal based on the submix audio signals received from each of the plurality of array microphones; and
    generate the gating control signal based on the one or more reduced bandwidth metrics received from each of the plurality of array microphones;
  wherein the one or more reduced bandwidth metrics and the submix audio signal are transmitted from each of the plurality of array microphones to the aggregator unit over respective hidden audio transport channels; and
  wherein the gating control signal is transmitted from the aggregator unit to each of the plurality of array microphones over a further hidden audio transport channel.

2. The audio system of claim 1, wherein the one or more reduced bandwidth metrics comprise a basic level measurement.

3. The audio system of claim 1, wherein the aggregator unit is further configured to generate a noise adaptive threshold signal that denotes that one of the beamformed signals is above a background noise threshold.

4. The audio system of claim 1, wherein one of the plurality of array microphones comprises the aggregator unit.

5. A method, comprising:
  generating, using a beamformer in each of a plurality of array microphones and based on microphone signals from each of a plurality of microphone elements in one of the plurality of array microphones, one or more beamformed signals, wherein each of the one or more beamformed signals is associated with a lobe of one of the plurality of array microphones;
  determining, using a processing unit in each of the plurality of array microphones and based on the one or more beamformed signals, one or more reduced bandwidth metrics;
  generating, using the processing unit in each of the plurality of array microphones and based on the one or more beamformed signals and a gating control signal, a submix audio signal;
  generating, using the processing unit in each of the plurality of array microphones, an echo-cancelled submix audio signal based on the one or more beamformed signals, the gating control signal, information gathered from the one or more beamformed signals, and a reference audio signal;
  generating, using an aggregator unit in communication with the plurality of array microphones and based on the echo-cancelled submix audio signal received from each of the plurality of array microphones, a final mix audio signal; and
  generating, using the aggregator unit and based on the one or more reduced bandwidth metrics received from each of the plurality of array microphones, the gating control signal.

6. The method of claim 5, further comprising generating, using the aggregator unit, a noise adaptive threshold signal that denotes that one of the beamformed signals is above a background noise threshold.

7. The method of claim 5, further comprising transmitting each of the one or more reduced bandwidth metrics, the echo-cancelled submix audio signal, and the gating control signal over respective audio transport channels.

8. The method of claim 5,
  further comprising generating, using the processing unit in each of the plurality of array microphones, one or more gating gains, based on the one or more beamformed signals and the gating control signal; and
  wherein generating the echo-cancelled submix audio signal comprises generating, using the processing unit in each of the plurality of array microphones, the echo-cancelled submix audio signal based on the one or more beamformed signals, the submix audio signal, the one or more gating gains, and the reference audio signal.

9. The method of claim 5, further comprising:
  generating, using the processing unit in each of the plurality of array microphones, a pre-processed submix audio signal, based on the one or more beamformed signals; and
  generating, using the aggregator unit, a pre-processed mix audio signal based on the pre-processed submix audio signals received from each of the plurality of array microphones.

10. The method of claim 5, further comprising:
  mixing the one or more beamformed signals to produce the submix audio signal, using a mixer in the processing unit in each of the plurality of array microphones; and
  generating the echo-cancelled submix audio signal based on the submix audio signal, the information gathered from the one or more beamformed signals, and the reference audio signal, using an acoustic echo canceller in the processing unit in each of the plurality of array microphones.

11. The method of claim 10:
  further comprising selecting at least one of the one or more beamformed signals and conveying the at least one selected beamformed signal to the acoustic echo canceller, using a signal selection mechanism in the processing unit of each of the plurality of array microphones; and
  wherein generating the echo-cancelled submix audio signal comprises generating the echo-cancelled submix audio signal based on the submix audio signal, information gathered from the at least one selected beamformed signal, and the reference audio signal, using the acoustic echo canceller.

12. The method of claim 5, further comprising processing the echo-cancelled submix audio signal for noise reduction, based on the gating control signal, using the processing unit.

13. The method of claim 5, wherein the one or more reduced bandwidth metrics comprise a basic level measurement.

14. The method of claim 5, wherein one of the plurality of array microphones comprises the aggregator unit.

15. An audio system, comprising:
(A) a plurality of array microphones each comprising:
   a plurality of microphone elements, wherein each of the plurality of microphone elements is configured to provide a microphone signal;
   a beamformer in communication with the plurality of microphone elements, wherein the beamformer is configured to generate one or more beamformed signals based on the microphone signals from each of the plurality of microphone elements, and wherein each of the one or more beamformed signals is associated with a lobe of the array microphone; and
   a processing unit configured to receive the one or more beamformed signals from the beamformer, determine one or more reduced bandwidth metrics based on the one or more beamformed signals, and generate a submix audio signal based on the one or more beamformed signals and a gating control signal; and
(B) an aggregator unit in communication with the plurality of array microphones, wherein the aggregator unit is configured to:
   generate a final mix audio signal based on the submix audio signals received from each of the plurality of array microphones; and
   generate the gating control signal based on the one or more reduced bandwidth metrics received from each of the plurality of array microphones;
wherein one or more of the one or more reduced bandwidth metrics, the submix audio signal, and the gating control signal is transmitted over respective encrypted channels.

16. The audio system of claim 15, wherein the one or more reduced bandwidth metrics comprise a basic level measurement.

17. The audio system of claim 15, wherein the aggregator unit is further configured to generate a noise adaptive threshold signal that denotes that one of the beamformed signals is above a background noise threshold.

18. The audio system of claim 15, wherein one of the plurality of array microphones comprises the aggregator unit.

19. An audio system, comprising:
(A) a plurality of array microphones each comprising:
   a plurality of microphone elements, wherein each of the plurality of microphone elements is configured to provide a microphone signal;
   a beamformer in communication with the plurality of microphone elements, wherein the beamformer is configured to generate one or more beamformed signals based on the microphone signals from each of the plurality of microphone elements, and wherein each of the one or more beamformed signals is associated with a lobe of the array microphone; and
   a processing unit configured to receive the one or more beamformed signals from the beamformer, determine one or more reduced bandwidth metrics based on the one or more beamformed signals, and generate a submix audio signal based on the one or more beamformed signals and a gating control signal; and
(B) an aggregator unit in communication with the plurality of array microphones, wherein the aggregator unit is configured to:
   generate a final mix audio signal by mixing at least one local microphone signal with the submix audio signals received from each of the plurality of array microphones; and
   generate the gating control signal based on the one or more reduced bandwidth metrics received from each of the plurality of array microphones and information derived from the at least one local microphone signal.

20. The audio system of claim 19, wherein the one or more reduced bandwidth metrics comprise a basic level measurement.

21. The audio system of claim 19, wherein the aggregator unit is further configured to generate a noise adaptive threshold signal that denotes that one of the beamformed signals is above a background noise threshold.

22. The audio system of claim 19, wherein one of the plurality of array microphones comprises the aggregator unit.

23. The audio system of claim 19, wherein one or more of the one or more reduced bandwidth metrics, the submix audio signal, and the gating control signal is transmitted over respective audio transport channels.

* * * * *